(12) United States Patent
Hayashi

(10) Patent No.: US 8,997,911 B2
(45) Date of Patent: Apr. 7, 2015

(54) VEHICLE

(75) Inventor: Koki Hayashi, Tokyo (JP)

(73) Assignee: Equos Research, Co., Ltd., Tokyo (JP)

( * ) Notice: Subject to any disclaimer, the term of this patent is extended or adjusted under 35 U.S.C. 154(b) by 0 days.

(21) Appl. No.: 14/129,248

(22) PCT Filed: Jul. 26, 2012

(86) PCT No.: PCT/JP2012/068909
§ 371 (c)(1),
(2), (4) Date: Dec. 24, 2013

(87) PCT Pub. No.: WO2013/015342
PCT Pub. Date: Jan. 31, 2013

(65) Prior Publication Data
US 2014/0124286 A1 May 8, 2014

(30) Foreign Application Priority Data

Jul. 26, 2011 (JP) ................................. 2011-162714

(51) Int. Cl.
*B62D 61/06* (2006.01)
*B62K 5/02* (2013.01)
*B62D 9/02* (2006.01)
*B60G 17/015* (2006.01)
*B60G 9/02* (2006.01)
*B62K 5/025* (2013.01)
*B62K 5/10* (2013.01)
*B62D 9/04* (2006.01)

(52) U.S. Cl.
CPC ................ *B62D 9/02* (2013.01); *B60G 17/015* (2013.01); *B60G 9/02* (2013.01); *B62K 5/025* (2013.01); *B62K 5/10* (2013.01); *B60G 2300/45* (2013.01); *B62D 9/04* (2013.01)

(58) Field of Classification Search
USPC ............. 280/5.509, 5.508; 180/210, 211, 443
See application file for complete search history.

(56) References Cited

U.S. PATENT DOCUMENTS

| 6,328,125 | B1 * | 12/2001 | Van Den Brink et al. ..... 180/211 |
| 8,781,684 | B2 * | 7/2014 | Bruce ............................... 701/41 |
| 2013/0297152 | A1 * | 11/2013 | Hayashi et al. .................. 701/42 |

FOREIGN PATENT DOCUMENTS

| JP | A-2008-155671 | 7/2008 |
| JP | A-2010-254164 | 11/2010 |
| JP | A-2011-46297 | 3/2011 |
| JP | A-2012-17042 | 1/2012 |

OTHER PUBLICATIONS

International Search Report issued in International Patent Application No. PCT/JP2012/068909 dated Oct. 30, 2012 (w/ translation).

* cited by examiner

*Primary Examiner* — Joseph Rocca
*Assistant Examiner* — Marlon Arce
(74) *Attorney, Agent, or Firm* — Oliff PLC

(57) ABSTRACT

A vehicle includes a vehicle body having a steering section and a main body section connected together; a steerable wheel which is rotatably mounted to the steering section and which steers the vehicle body; a non-steerable wheel which is rotatably mounted to the main body section; a steering apparatus for inputting a steering instruction information; an inclination actuator apparatus for inclining the steering section or the main body section in a turning direction; a steering actuator apparatus for varying a steering angle of the steerable wheel based on the steering instruction information inputted from the steering apparatus; and a control apparatus which controls the inclination actuator apparatus and the steering actuator apparatus. The control apparatus controls a center of gravity to move in a steering direction included in the steering instruction information at an initial steering stage so that an acceleration toward turning-locus inner side is generated.

5 Claims, 18 Drawing Sheets

F I G. 6
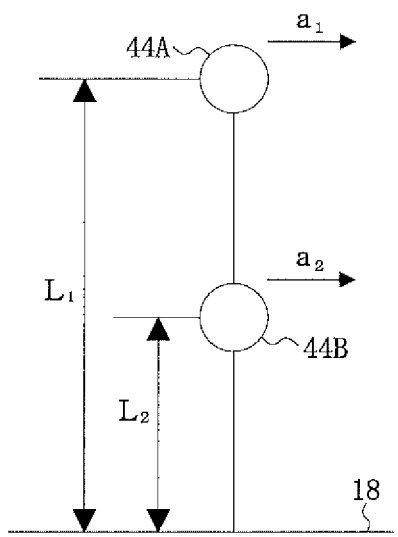

VEHICLE

TECHNICAL FIELD

The present invention relates to a vehicle which has at least a pair of wheels; i.e., left and right wheels.

BACKGROUND ART

In recent years, in view of exhaustion of energy resources, reduction of fuel consumption of vehicles has been strongly demanded. Meanwhile, due to a drop in price and other factors, the number of peoples who own vehicles increases, and a recent trend is that one person has one vehicle. Therefore, there has been a problem in that a driver solely occupies a vehicle which can carry four people, whereby energy is wasted uselessly. The most efficient way of reducing the fuel consumption of a vehicle through reduction of the size thereof is to configure the vehicle as a three-wheel or four-wheel single seater.

However, depending on the travel state, the stability of a vehicle may lower. In order to overcome this, there has been proposed a technique of inclining the body of a vehicle in a lateral direction to thereby improve the stability of the vehicle at the time of turning (see, for example, Patent Document 1).

PRIOR ART DOCUMENT

Patent Document

Patent Document 1: Japanese Patent Application Laid-Open (kokai) No. 2008-155671

DISCLOSURE OF THE INVENTION

Problem to be Solved by the Invention

In the above-mentioned conventional vehicle, in order to improve turning performance, the vehicle body is inclined toward the inner side of a turning locus (hereinafter referred to as the "turning-locus inner side"). However, because of an influence of centrifugal force toward the outer side of a turning locus (hereinafter referred to as the "turning-locus outer side"), a stability of vehicle tends to be low especially in such cases as a tread of vehicle is narrow, a center of gravity of vehicle is high, or a steering speed is high. Therefore, the vehicle occupant has uncomfortable sensation and/or becomes uneasy.

The present invention has solved the problem of the above-mentioned conventional vehicle, and its object is to provide a vehicle in which the center of gravity of vehicle is controlled to move toward a steering direction included in a steering instruction information at an initial stage of steering operation or an initial steering stage so that an acceleration toward turning-locus inner side is generated. Thus, even in such cases as the tread of vehicle is narrow, the center of gravity of vehicle is high, or the steering speed is high, the vehicle body can incline smoothly toward turning-locus inner side. Therefore, it is possible to provide a highly safe vehicle which can maintain the stability of the vehicle body, which has an improved turning performance, and which can realize a stable travel state in which the occupant can enjoy a comfortable ride without feeling any unnatural sensation.

Means for Solving the Problems

In order to achieve the object, the present invention provides a vehicle comprising a vehicle body which includes a steering section and a main body section connected together; a steerable wheel which is rotatably mounted to the steering section and which steers the vehicle body; a non-steerable wheel which is rotatably mounted to the main body section; a steering apparatus for inputting a steering instruction information; an inclination actuator apparatus for inclining the steering section or the main body section in a turning direction; a steering actuator apparatus for varying a steering angle of the steerable wheel based on the steering instruction information inputted from the steering apparatus; and a control apparatus which controls the inclination actuator apparatus and the steering actuator apparatus. The control apparatus controls a center of gravity of the vehicle to move in a steering direction included in the steering instruction information at an initial steering stage so that an acceleration toward turning-locus inner side is generated.

Effects of the Invention

According to the configuration of Claim 1, the center of gravity of vehicle can be moved toward turning-locus inner side at the initial steering stage, and the vehicle body can incline smoothly toward turning-locus inner side. Therefore, the stability of the vehicle body can be maintained without sacrificing drivability or risk aversion ability.

According to the configuration of Claim 2, only by varying the steering angle of the steerable wheel in the direction opposite to the steering direction included in the steering instruction information at the initial steering stage, the center of gravity of vehicle can be moved toward turning-locus inner side. Therefore, the vehicle body can incline smoothly toward turning-locus inner side at the initial steering stage, without complicated structure.

According to the configurations of Claims 3-5, the steering angle of the steerable wheel can be varied in the direction opposite to the steering direction included in the steering instruction information only at the initial steering stage, the steering angle of the steerable wheel cannot be varied in the direction opposite to the steering direction included in the steering instruction information at an final stage of steering operation or at a final steering stage. Therefore, the stability of the vehicle body can be maintained.

BRIEF DESCRIPTION OF THE DRAWINGS

[FIG. 6] Illustration relating to the first embodiment of the present invention and showing a dynamic model used for describing an operation of inclining the vehicle body at the time of turn travel.

MODE FOR CARRYING OUT THE INVENTION

Embodiments of the present invention will now be described in detail with reference to the drawings.

Figure 1:
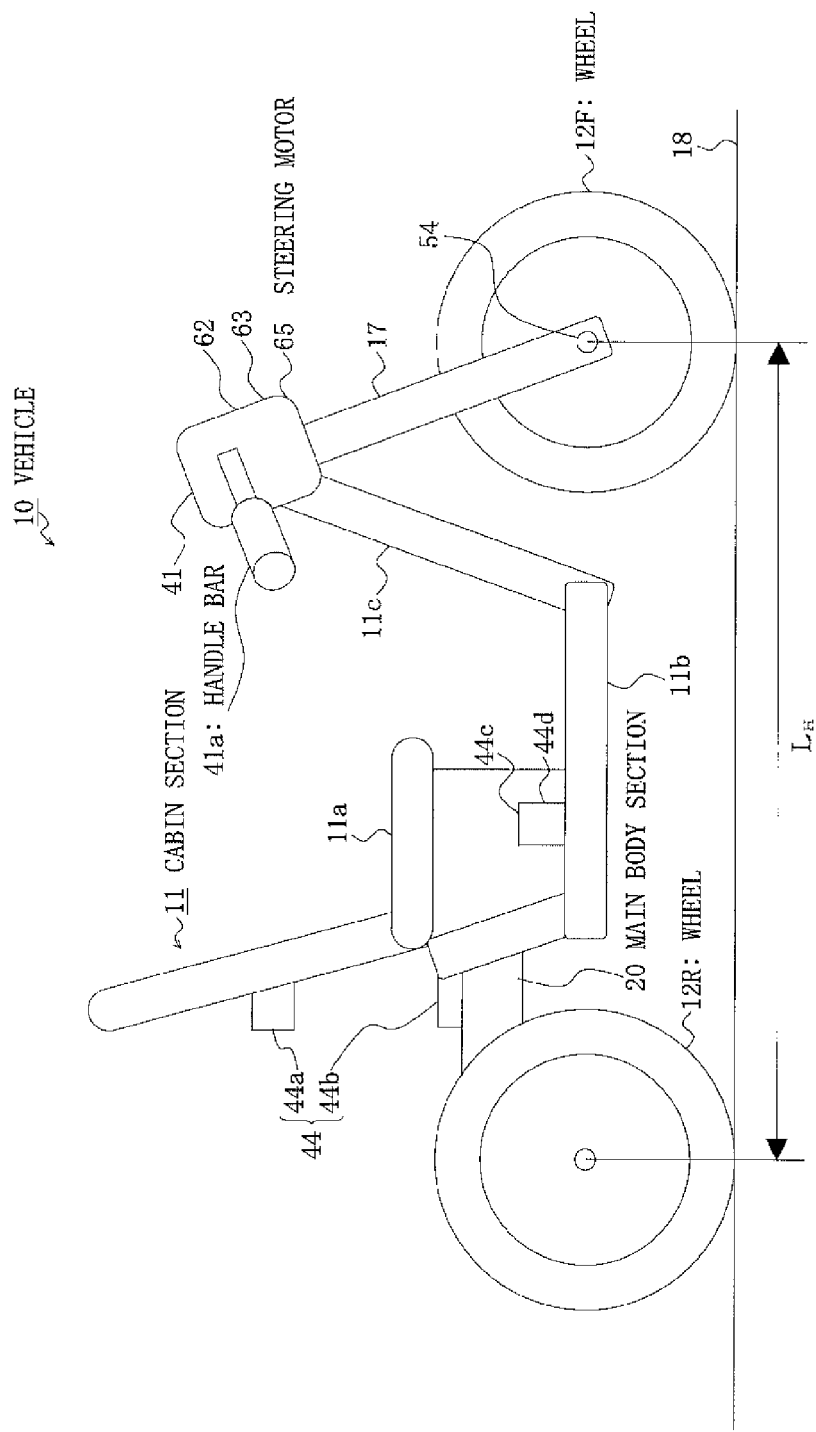
[FIG. 1] Right side view showing the structure of a vehicle according to a first embodiment of the present invention.
Figure 2:
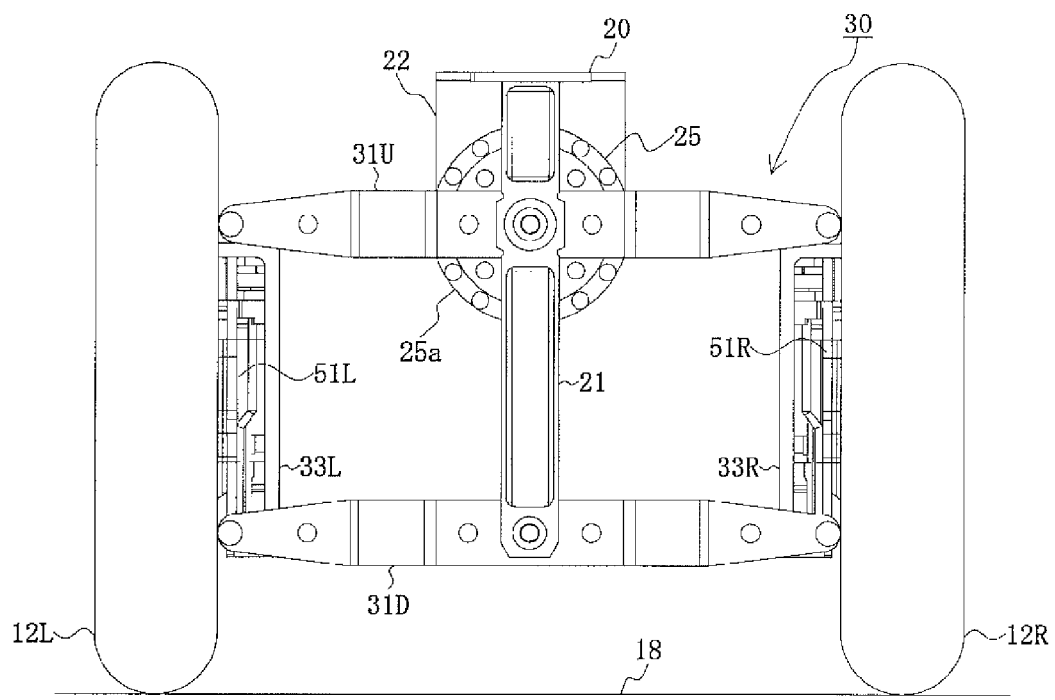
[FIG. 2] View showing the structure of a link mechanism of the vehicle according to the first embodiment of the present invention.
Figure 3:
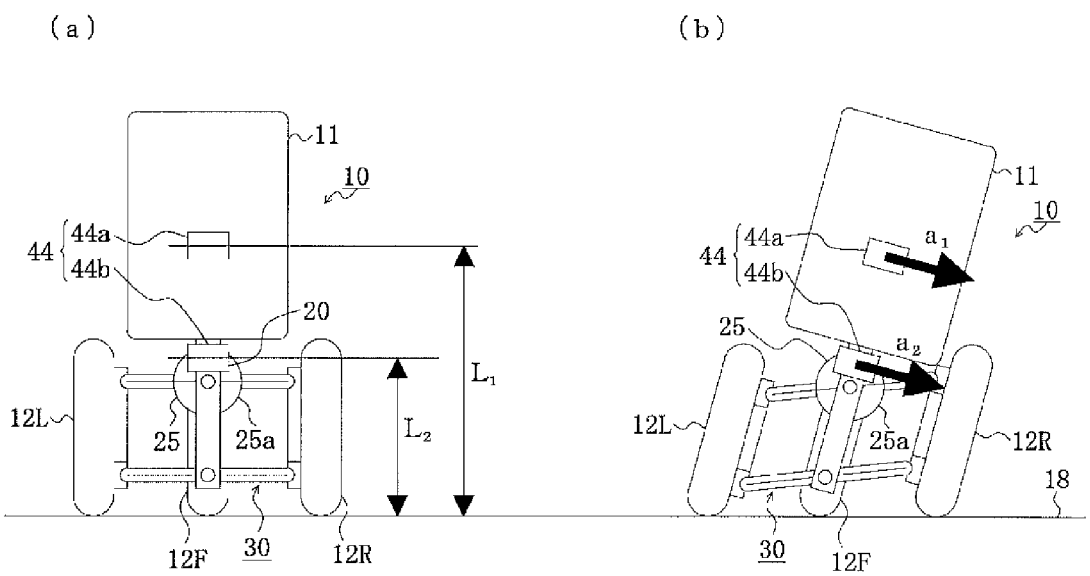
[FIG. 3] Rear view showing the structure of the vehicle according to the first embodiment of the present invention.

FIG. 1 is a right side view showing the structure of a vehicle according to a first embodiment of the present invention. FIG. 2 is a view showing the structure of a link mechanism of the vehicle according to the first embodiment of the present invention. FIG. 3 is a rear view showing the structure of the vehicle according to the first embodiment of the present invention. Notably, in FIG. 3, (a) is a view showing a state in which the vehicle body is upright, and (b) is a view showing a state in which the vehicle body inclines.

In these drawings, reference numeral 10 denotes the vehicle according to the present embodiment. The vehicle 10 has a main body section 20, which serves as a drive section of the vehicle body; a cabin section 11, which serves as a steering section into which an occupant gets and in which the occupant steers the vehicle; a front wheel 12F which is disposed at the front of the vehicle body to be located at the center in the width direction and which serves as a steerable wheel; and left and right rear wheels 12L and 12R which are disposed at the rear of the vehicle and which serve as non-steerable drive wheels. Further, the vehicle 10 includes a link mechanism 30 which supports the left and right wheels 12L and 12R and which serves as a lean mechanism (i.e., a vehicle body inclining mechanism) for inclining (i.e., leaning) the vehicle body leftward or rightward; and a link motor 25 which serves as an inclination actuator apparatus which is an actuator for operating the link mechanism 30. Notably, the vehicle 10 may be a three-wheel vehicle which has two (left and right) front wheels and a single rear wheel, or a four-wheel vehicle which has two (left and right) front wheels and two (left and right) rear wheels. However, in the present embodiment, as shown in the drawings, the vehicle 10 is a three-wheel vehicle which has one front wheel and two (left and right) rear wheels. And the steerable wheel may function as a drive wheel, though, in the present embodiment, the steerable wheel does not function as a drive wheel.

At the time of turning, the angles of the left and right wheels 12L and 12R in relation to a road surface 18; i.e., the camber angle thereof, is changed, and the vehicle body including the cabin section 11 and the main body section 20 is inclined toward the inner wheel located on the inner side of a turning locus, whereby turning performance is improved, and the occupant can enjoy a comfortable ride. Namely, the vehicle 10 can incline the vehicle body in the lateral direction (left-right direction) too. Notably, in the example shown in FIGS. 2 and 3(a), the left and right wheels 12L and 12R stand upright on the road surface 18; i.e., the camber angle is 0 degree. Also, in the example shown in FIG. 3(b), the left and right wheels 12L and 12R incline rightward on the road surface 18; i.e., a camber angle is provided.

The link mechanism 30 includes a left vertical link unit 33L which supports the left wheel 12L and a left rotational drive apparatus 51L which is composed of an electric motor or the like and which supplies drive force to the wheel 12L; a right vertical link unit 33R which supports the right wheel 12R and a right rotational drive apparatus 51R which is composed of an electric motor or the like and which supplies drive force to the wheel 12R; an upper lateral link unit 31U which connects together the upper ends of the left and right vertical link units 33L and 33R; a lower lateral link unit 31D which connects together the lower ends of the left and right vertical link units 33L and 33R; and a central vertical member 21 whose upper end is fixed to the main body section 20 and which extends in the vertical direction. The left and right vertical link units 33L and 33R are rotatably connected to the upper and lower lateral link units 31U and 31D. Central portions of the upper and lower lateral link units 31U and 31D are rotatably connected to the central vertical member 21. Notably, in the case where the left and right wheels 12L and 12R, the left and right rotational drive apparatuses 51L and 51R, the left and right vertical link units 33L and 33R, and the upper and lower lateral link units 31U and 31D are collectively described, they are referred to as the wheel 12, the rotational drive apparatus 51, the vertical link unit 33, and the lateral link unit 31, respectively.

The rotational drive apparatus 51, which serves as a drive actuator apparatus, is a so-called in-wheel motor. The in-wheel motor has a body (stator) fixed to the vertical link unit 33, and a rotation shaft (rotor) which is rotatably attached to the body and which is connected the axle of the wheel 12. The wheel 12 is rotated as a result of rotation of the rotation shaft. Notably, the rotational drive apparatus 51 may be a motor of a type other than the in-wheel type.

The link motor 25 is a rotary-type electric actuator including an electric motor or the like. The link motor 25 has a cylindrical body (stator) and a rotation shaft (rotor) rotatably attached to the body. The body is fixed to the main body section 20 through a mounting flange 22. The rotation shaft is fixed to the upper lateral link unit 31U of the link mechanism 30. Notably, the rotation shaft of the link motor 25 functions as an inclination shaft for inclining the main body section 20, and is coaxial with a rotation shaft at a connection portion between the central vertical member 21 and the upper lateral link unit 31U. When the link motor 25 is driven so as to rotate its rotation shaft relative to the body, the upper lateral link unit 31U rotates relative to the main body section 20 and the central vertical member 21 fixed to the main body section 20, whereby the link mechanism 30 operates; i.e., bends and stretches. As a result, the main body section 20 can be inclined. Notably, the link motor 25 may be used in such a manner that its rotation shaft is fixed to the main body section 20 and the central vertical member 21, and its body is fixed to the upper lateral link unit 31U.

The link motor 25 has a link angle sensor 25a which detects changes in the link angle of the link mechanism 30. The link angle sensor 25a is a rotational angle sensor for detecting the rotational angle of the rotation shaft relative to the body in the link motor 25, and is composed of, for example, a resolver, encoder, or the like. As described above, when the link motor 25 is driven so as to rotate its rotation shaft relative to the body, the upper lateral link unit 31U rotates relative to the main body section 20 and the central vertical member 21 fixed to the main body section 20. Therefore, changes in the angle of the upper lateral link unit 31U relative to the central vertical member 21 (i.e., changes in the link angle) can be detected by detecting the rotational angle of the rotation shaft relative to the body.

The link motor 25 includes an unillustrated lock mechanism for non-rotatably fixing the rotation shaft to the body. It is desired that the lock mechanism be a mechanical structure which does not consume electric power during a period during which it non-rotatably fixes the rotation shaft to the body. The rotation shaft can be non-rotatably fixed to the body, by the lock mechanism, at a predetermined angel relative to the body.

The cabin section 11 is connected to the front end of the main body section 20 through an unillustrated connection portion. The connection portion may have a function of connecting the cabin section 11 and the main body section 20 such that they can move relative to each other in a predetermined direction.

The cabin section 11 includes a seat 11a, a foot rest 11b, and a windscreen 11c. The seat 11a is a portion where the occupant seats when he or she operates the vehicle 10 to travel. The foot rest 11b is a portion for supporting the feet of the occupant, and is provided on the front side (on the right side in FIG. 1) of the seat 11a to be located below the seat 11a.

An unillustrated battery apparatus is disposed on the rear side or lower side of the cabin section 11 or within the main body section 20. The battery apparatus is an energy supply source for the rotational drive apparatus 51 and the link motor 25. Also, an unillustrated control apparatus, an inverter apparatus, various sensors, etc. are accommodated on the rear side or lower side of the cabin section 11 or within the main body section 20.

A maneuvering apparatus 41 is disposed on the front side of the seat 11a. Members necessary for maneuvering the vehicle 10, such as a handle bar 41a, which serves as a steering apparatus to be operated by the occupant for inputting a steering instruction information such as a steering direction or a steering angle, meters such as a speed meter, indicators, and switches, are disposed on the maneuvering apparatus 41. The occupant instructs the travel state of the vehicle 10 (for example, travel direction, travel speed, turning direction, turning radius, etc.) by operating the handle bar 41a and other members. In place of the handle bar 41a, a steering apparatus of a different type, such as a steering wheel, a jog dial, a touch panel, or a push button, may be used.

The wheel 12F is connected to the cabin section 11 through a front wheel fork 17 which is a portion of a suspension apparatus. The suspension apparatus is similar to a suspension apparatus for a front wheel which is used in, for example, a common motorcycle, bicycle, or the like. For example, the front wheel fork 17 is a telescopic-type fork which includes a spring. Like a common motorcycle, bicycle, or the like, the wheel 12F, which serves as a steerable wheel, varies the steering angle in accordance with the operation of the handle bar 41a by the occupant, whereby the travel direction of the vehicle 10 changes.

Specifically, the handle bar 41a is connected to the upper end of an unillustrated steering shaft member, and the upper end of the steering shaft member is rotatably mounted to an unillustrated frame member of the cabin section 11. The steering shaft member is mounted to the frame member in an inclined state such that the upper end of the steering shaft member is located rearward of the lower end thereof. A handle bar angle sensor 62 as an inputted steering angle detecting means detects a rotational angle of the upper end of the steering shaft to the frame member or a handle bar angle, which serves as a steering angle instruction value, inputted by the occupant operating the handle bar 41a. The handle bar angle sensor 62 is composed of an encoder, etc.

Between the upper and lower ends of the steering shaft member, a steering motor 65 which serves as a steering actuator apparatus is allocated. The steering motor 65 rotates the lower end of the steering shaft member based on the handle bar angle detected by the handle bar angle sensor 62. The lower end of the steering shaft member is rotatably mounted to the frame member and is connected to the upper end of the front wheel fork 17. A rotational angle of the lower end of the steering shaft member to the frame member or the steering angle, which is outputted by the steering motor 65 and is transferred via the front wheel fork 17 to the wheel 12F, is detected by a steering angle sensor 63 which serves as an outputted steering angle detecting means. The steering angle sensor 63 is, for example, a rotational angle sensor for detecting a rotational angle of a rotation shaft to a body in the steering motor 65, and is composed of, for example, a resolver, encoder, or the like. The distance between the axle of the front wheel 12F and the axles of the left and right rear wheels 12L and 12R; i.e., the wheel base is represented by $L_H$.

A vehicle speed sensor 54, which serves as vehicle speed detection means for detecting vehicle speed (travel speed of the vehicle 10), is disposed at the lower end of the front wheel fork 17, which supports the axle of the wheel 12F. The vehicle speed sensor 54 is a sensor for detecting the vehicle speed on the basis of the rotational speed of the wheel 12F, and is composed of an encoder, etc.

In the present embodiment, the vehicle 10 has a lateral acceleration sensor section 44. The lateral acceleration sensor section 44 is composed of a common acceleration sensor, a gyro sensor, etc., and detects lateral acceleration of the vehicle 10; i.e., acceleration in the lateral direction (the left-right direction in FIG. 3), which corresponds to the width direction of the vehicle body.

At the time of turning, the vehicle 10 inclines the vehicle body toward the turning-locus inner side for stable travel. Therefore, the inclination angle of the vehicle body is controlled such that a balance is achieved between a centrifugal toward the turning-locus outer side at the time of turning and the force of gravity. Such control makes it possible to always maintain the vehicle body in a horizontal state, for example, even when the road surface 18 inclines in a direction perpendicular to the travel direction (leftward or rightward in relation to the travel direction). Thus, it can be seen that the force of gravity always acts on the vehicle body and the occupant downward in the vertical direction. Therefore, unnatural sensation is mitigated, and the stability of the vehicle 10 improved.

In view of the above, in the present embodiment, the lateral acceleration sensor section 44 is attached to the vehicle body in order to detect the acceleration of the inclining vehicle body in the lateral direction, and feedback control is performed such that the output of the lateral acceleration sensor section 44 becomes zero. Thus, the vehicle body can be inclined to an inclination angle at which a balance is achieved between the centrifugal force acting on the vehicle body at the time of turning and the force of gravity. Also, even when the road surface 18 inclines in a direction perpendicular to the travel direction, the inclination angle of the vehicle body can be controlled such that the vehicle body becomes vertical. Notably, the lateral acceleration sensor section 44 is disposed at the center of the vehicle body in the width direction; i.e., is disposed to be located on the vertical axis of the vehicle body.

However, in the case where the lateral acceleration sensor section 44 is composed of one lateral acceleration sensor, unnecessary accelerations component may be detected. For example, only one of the left and right wheels 12L and 12R may fall into a hollow of the road surface 18 while the vehicle 10 is travelling. In such a case, since the vehicle body inclines, the lateral acceleration sensor section 44 moves in a circumferential direction and detects an acceleration in the circumferential direction. Namely, acceleration components which do not originate directly from the centrifugal force or the force of gravity; i.e., unnecessary acceleration components are detected.

Also, the vehicle 10 includes portions, such as the tire portions of the wheels 12L and 12R, which have elasticity and function as springs, and also has unavoidable plays at connection portions of various members, etc. Therefore, the lateral acceleration sensor section 44 is considered to be attached to the vehicle body via unavoidable plays and springs, and the lateral acceleration sensor section 44 detects accelerations produced by the plays and deformation of the springs as unnecessary acceleration components.

Such unnecessary acceleration components may deteriorate the control performance of the vehicle inclination control system. For example, when the control gain of the vehicle inclination control system is increased, vibration, divergence, etc. of the control system due to the unnecessary acceleration components are generated. Therefore, it becomes impossible to increase the control gain so as to improve responsiveness.

In view of the above, in the present embodiment, the lateral acceleration sensor section 44 is composed of a plurality of lateral acceleration sensors provided at different heights. In the example shown in FIGS. 1 and 3, the lateral acceleration sensor section 44 is composed of two lateral acceleration sensors; i.e., a first lateral acceleration sensor 44a and a second lateral acceleration sensor 44b. The first lateral acceleration sensor 44a and the second lateral acceleration sensor 44b are disposed at vertical positions which differ from each other. Unnecessary acceleration components can be removed effectively by properly selecting the positions of the first lateral acceleration sensor 44a and the second lateral acceleration sensor 44b.

Specifically, as shown in FIG. 3(a), the first lateral acceleration sensor 44a is disposed on the back surface of the cabin section 11 such that the distance from the road surface 18; i.e., its height, becomes $L_1$. The second lateral acceleration sensor 44b is disposed on the back surface of the cabin section 11 or the upper surface of the main body section 20 such that the distance from the road surface 18; i.e., its height, becomes $L_2$. Notably, the heights $L_1$ and $L_2$ satisfy a relation $L_1 > L_2$. When as shown in FIG. 3(b) the vehicle 10 turns in a state in which the vehicle body inclines toward the turning-locus inner side (the right side in the drawing), the first lateral acceleration sensor 44a detects an acceleration in the lateral direction and outputs a detection value $a_1$, and the second lateral acceleration sensor 44b detects an acceleration in the lateral direction and outputs a detection value $a_2$. Notably, strictly speaking, the center of inclining motion of the vehicle body; i.e., the roll center, is located slightly below the road surface 18. However, in actuality, the roll center is considered to be located at a position approximately equal to that of the road surface 18.

It is desired that both the first lateral acceleration sensor 44a and the second lateral acceleration sensor 44b be attached to a member which is sufficiently high in rigidity. Also, since the difference between the detection values $a_1$ and $a_2$ decreases with the difference between $L_1$ and $L_2$, it is desired that the difference between $L_1$ and $L_2$ be sufficiently large, for example, 0.3 m or greater. Moreover, it is desired that both the first lateral acceleration sensor 44a and the second lateral acceleration sensor 44b be disposed above the link mechanism 30. Moreover, in the case where the vehicle body is supported by a spring such as a suspension, it is desired that both the first lateral acceleration sensor 44a and the second lateral acceleration sensor 44b be disposed on a so-called "sprung" side. Moreover, it is desired that both the first lateral acceleration sensor 44a and the second lateral acceleration sensor 44b be disposed between the axle of the front wheel 12F and the axles of the rear wheels 12L and 12R. Moreover, it is desired that both the first lateral acceleration sensor 44a and the second lateral acceleration sensor 44b be disposed at a position as close as possible to the occupant. Moreover, it is desired that both the first lateral acceleration sensor 44a and the second lateral acceleration sensor 44b be located on the center axis of the vehicle body which extends in the travel direction as viewed from the upper side; i.e., be not offset in a direction perpendicular to the travel direction.

In the present embodiment, a roll rate sensor 44c and a yaw rate sensor 44d are provided on the vehicle 10. The roll rate sensor 44c detects the angular velocity of inclining motion of the vehicle body. The yaw rate sensor 44d serves as yaw angular velocity detection means for detecting the yaw angular velocity of turn motion of the vehicle body; i.e., the yaw angular velocity of the vehicle body. Specifically, it is desired that both the roll rate sensor 44c and the yaw rate sensor 44d be located on the center axis of the vehicle body which extends in the travel direction as viewed from the upper side; i.e., be not offset in a direction perpendicular to the travel direction. For example, the roll rate sensor 44c and the yaw rate sensor 44d are disposed between the seat 11a and the foot rest 11b.

Notably, the roll rate sensor 44c is a common roll rate sensor which is composed of, for example, a gyro sensor which is mounted such that it can detect rotational angular velocity in a plane perpendicular to the road surface 18. Also, the yaw rate sensor 44d is a common yaw rate sensor which is composed of, for example, a gyro sensor which is mounted such that it can detect rotational angular velocity in a plane parallel to the road surface 18. Notably, a three-dimensional gyro sensor which can function as the roll rate sensor 44c and the yaw rate sensor 44d may be employed. Namely, the roll rate sensor 44c and the yaw rate sensor 44d may be formed separately or integrally formed as a single sensor unit.

The vehicle 10 according to the present embodiment includes a vehicle inclination control system, which is a portion of the control apparatus. The vehicle inclination control system is a computer system, and includes an inclination control apparatus and a steering control apparatus composed of an ECU (Electronic Control Unit), etc. The inclination control apparatus includes computation means (a processor, etc.), storage means (a magnetic disc, semiconductor memory, etc.), an input/output interface, etc. The inclination control apparatus is connected to the link angle sensor 25a, the first lateral acceleration sensor 44a, the second lateral acceleration sensor 44b, the roll rate sensor 44c, the yaw rate sensor 44d, the vehicle speed sensor 54, and the link motor 25. The inclination control apparatus outputs a torque instruction value for operating the link motor 25. The steering control apparatus includes computation means (a processor, etc.), storage means (a magnetic disc, semiconductor memory, etc.), an input/output interface, etc. The steering control apparatus is connected to the handle bar angle sensor 62, the steering angle sensor 63, the vehicle speed sensor 54, and the steering motor 65. The steering control apparatus outputs a control pulse for operating the steering motor 65. And the inclination control apparatus and the steering control apparatus are connected each other. The inclination control apparatus and the steering control apparatus need not necessarily be formed separately but may be integrally formed as a single unit.

When the vehicle 10 turns while travelling, the inclination control apparatus performs feedback control and feedforward control so as to operate the link motor 25 such that the inclination angle of the vehicle body becomes an angle at which the value of the lateral acceleration detected by the lateral acceleration sensor section 44 becomes zero. Namely, the inclination control apparatus controls the inclination angle of the vehicle body such that a balance is achieved between the centrifugal force toward the turning-locus outer side and the force of gravity, and the acceleration component in the lateral direction becomes zero. Thus, a force in a direction parallel to the vertical axis of the vehicle body acts on the vehicle body and the occupant in the cabin section 11. Accordingly, the stability of the vehicle body can be maintained, and the turning performance of the vehicle 10 can be improved.

Also, when the vehicle 10 receives a disturbance in the inclining direction, the inclination control apparatus extracts a portion of a change in the inclination angle of the vehicle body, which portion is attributable to the disturbance, controls the inclination angle of the vehicle body in an ordinary mode for the remaining portion, and controls the inclination angle of the vehicle body in a disturbance coping mode for the extracted portion. Accordingly, even when the vehicle 10 receives a disturbance, the stability of the vehicle body can be maintained. Also, the occupant does not feel an unnatural sensation, and the riding quality is improved.

In the present embodiment, the center of gravity of vehicle is controlled to move toward the steering direction included in the steering instruction information at an initial steering stage, so that the acceleration toward turning-locus inner side is generated. That is, at a stage just after the occupant started to operate the handle bar 41a, the center of gravity of vehicle is moved in the steering direction, thereby the acceleration toward turning-locus inner side is generated. A below mentioned steering control section 66 varies the steering angle of the wheel 12F as a steerable wheel in the direction opposite to the steering direction inputted by the operation of the handle bar 41a, at a stage just after the occupant started to operate the handle bar 41a. In another word, the steering control section 66 executes a counter-steering operation so as to move the center of gravity of vehicle toward the steering direction.

Specifically, the steering control apparatus sets a target figure of steering angle by subtracting a value from a value of handle bar angle. Thereby, the steering angle of the wheel 12F as a steerable wheel varies in the direction opposite to the steering direction (handling direction) at the initial steering stage (at a timing when the occupant starts to operate the handle bar 41a or the occupant starts to handle). That is, a counter-steering operation or a counter-handling operation is executed. Accordingly, a turn in a direction opposite to the occupant intention starts at the initial steering stage, and a centrifugal force generated by the turn functions as a force for inclining the vehicle body toward turning-locus inner side as the occupant intended, so that, by utilizing the this force for vehicle inclination control, the vehicle body can incline smoothly toward turning-locus inner side. That is, the vehicle body can incline smoothly toward turning-locus inner side, since the center of gravity of vehicle is moved toward turning-locus inner side at the initial steering stage.

If the vehicle inclination control is performed without such steering control, it would be hard to incline the vehicle body toward turning-locus inner side and a stability of the vehicle 10 would be low in such cases as a tread (a distance between points of ground contact of the left and right rear wheels 12L and 12R) is narrow, the center of gravity of vehicle is high, or the steering speed is high, since the centrifugal force generated by the turn functions as a force to incline the vehicle body toward turning-locus outer side. However, if an angular velocity or acceleration of the steering angle of the wheel 12F as a steerable wheel becomes low, the centrifugal force would be restrained and the vehicle body could incline smoothly toward turning-locus inner side so that the stability of the vehicle 10 could be maintained. Even though in this case, drivability and risk aversion ability of the vehicle 10 would be deteriorated, since its mobility becomes lower.

On the other hand, in the present embodiment, as described above, the steering angle of the wheel 12F varies in the direction opposite to the steering direction at the initial steering stage, in the same way as the so-called counter-steering operation is executed. Thereby, the center of gravity of vehicle can be moved toward turning-locus inner side at the initial steering stage, and the vehicle body can incline smoothly toward turning-locus inner side, so that the stability of the vehicle body can be maintained without sacrificing drivability or risk aversion ability.

Next, the configuration of the vehicle inclination control system will be described.

Figure 4:
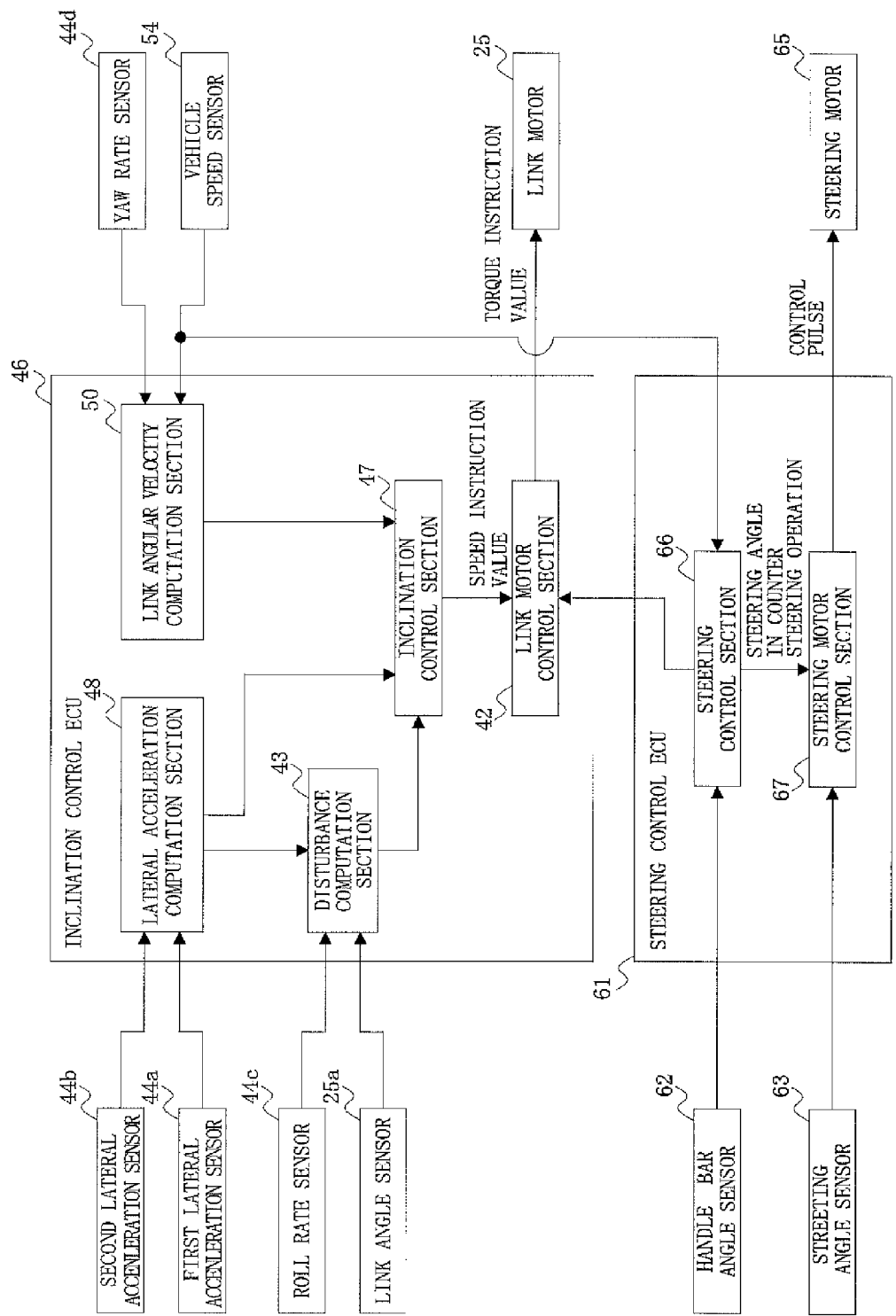
[FIG. 4] Block diagram showing the configuration of a vehicle inclination control system according to the first embodiment of the present invention.

FIG. 4 is a block diagram showing the configuration of the vehicle inclination control system according to the first embodiment of the present invention.

In FIG. 4, reference numeral 46 denotes an inclination control ECU, which serves as the inclination control apparatus. The inclination control ECU 46 is connected to the link angle sensor 25a, the first lateral acceleration sensor 44a, the second lateral acceleration sensor 44b, the roll rate sensor 44c, the yaw rate sensor 44d, the vehicle speed sensor 54, and the link motor 25. The inclination control ECU 46 includes a lateral acceleration computation section 48, a link angular velocity estimation section 50, a disturbance computation section 43, an inclination control section 47, and a link motor control section 42.

Reference numeral 61 denotes a steering control ECU, which serves as a steering control apparatus. The steering control ECU 61 is connected to the handle bar angle sensor 62, the steering angle sensor 63, the vehicle speed sensor 54, and the steering motor 65. The steering control ECU 61 includes the steering control section 66 and a steering motor control section 67.

The lateral acceleration computation section 48 calculates a combined lateral acceleration on the basis of the lateral accelerations detected by the first lateral acceleration sensor 44a and the second lateral acceleration sensor 44b. The link angular velocity estimation section 50 calculates a link angular velocity predicted value on the basis of the yaw rate (yaw angular velocity) which is detected by the yaw rate sensor 44d, and the vehicle speed detected by the vehicle speed sensor 54. The disturbance computation section 43 calculates a disturbing roll rate on the basis of the roll rate (the angular velocity of the inclining motion of the vehicle body) detected by the roll rate sensor 44c and the link angle detected by the link angle sensor 25a.

The inclination control section 47 computes and outputs a speed instruction value (control value) on the basis of the combined lateral acceleration calculated by the lateral acceleration computation section 48, the link angular velocity predicted value calculated by the link angular velocity estimation section 50, and the disturbing roll rate calculated by the disturbance computation section 43. On the basis of the speed instruction value outputted from the inclination control section 47, and a steerable wheel steering angle instruction value output from the steering control section 66, the link motor control section 42 outputs a torque instruction value (control value) for operating the link motor 25.

The steering control section 66 computes and outputs the steerable wheel steering angle instruction value (control value) on the basis of the handle bar angle detected by the handle bar angle sensor 62, and the vehicle speed detected by the vehicle speed sensor 54. On the basis of the steering angle detected by the steering angle sensor 63, and the steerable wheel steering angle instruction value output from the steering control section 66, the steering motor control section 67 outputs a control pulse a (control value) for operating the steering motor 65.

Next, operation of the vehicle 10 having the above-described configuration will be described. First, there will be described the operation of lateral acceleration computation processing, which is a portion of the operation of vehicle body inclination control processing performed during turn travel.

Figure 5:
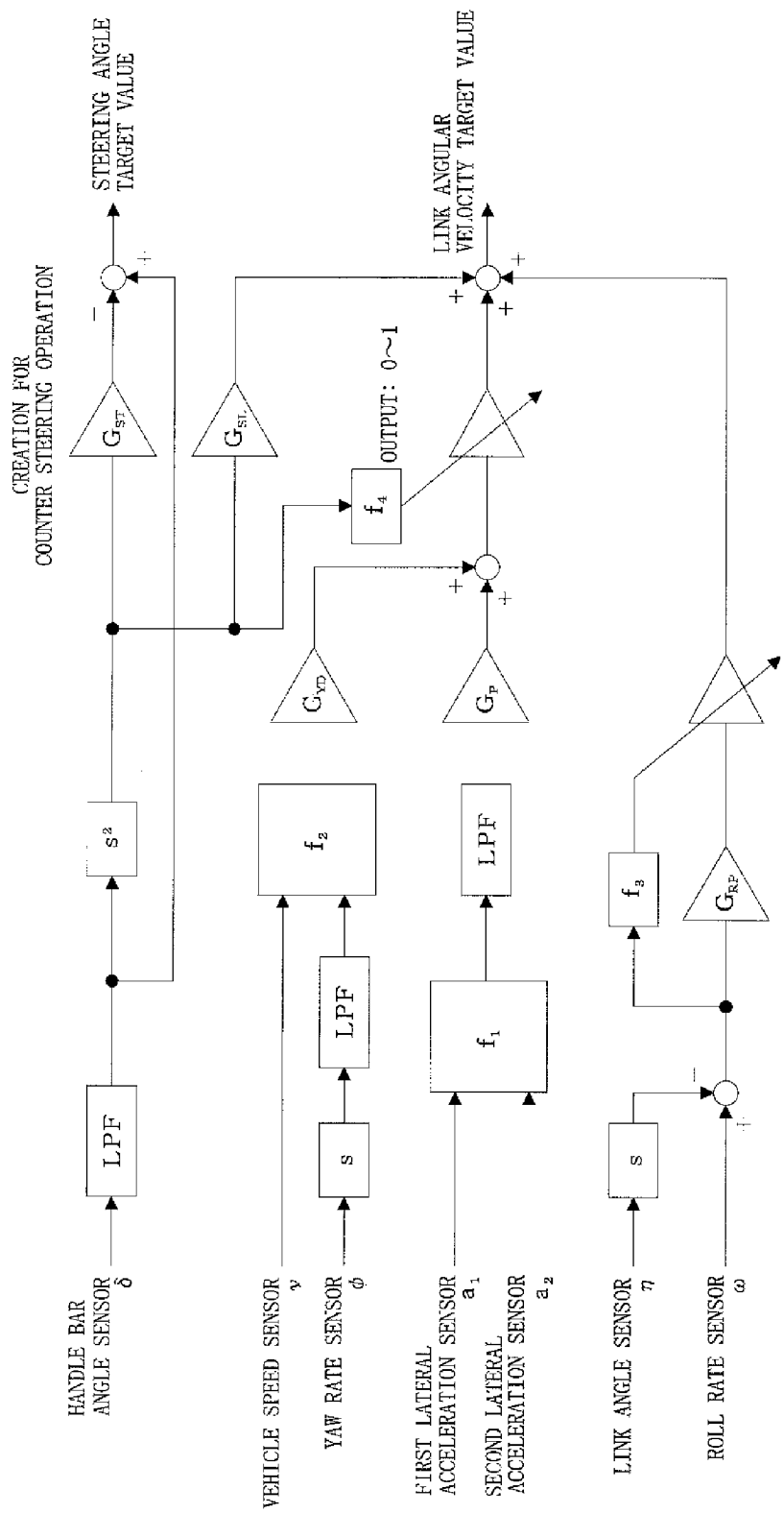
[FIG. 5] Block diagram of a control system according to the first embodiment of the present invention.
Figure 7:
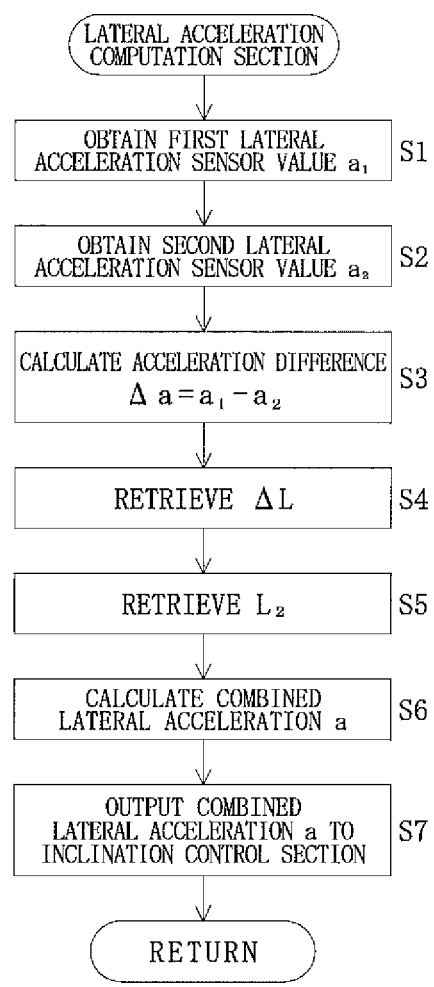
[FIG. 7] Flowchart showing the operation of lateral acceleration computation processing according to the first embodiment of the present invention.

FIG. 5 is a block diagram of the control system according to the first embodiment of the present invention. FIG. 6 is an illustration relating to the first embodiment of the present invention and showing a dynamic model used for describing an operation of inclining the vehicle body at the time of turn travel. FIG. 7 is a flowchart showing the operation of lateral acceleration computation processing according to the first embodiment of the present invention.

In the vehicle body inclination control processing according to the present embodiment, a control which is realized by combining inclination control by the inclination control ECU 46 and steering control by the steering control ECU 61 as shown in FIG. 5 is performed. Inclination control by the inclination control ECU 46 is realized by combining feedback control and feed forward control.

In FIG. 5, $f_1$ is a transfer function represented by Equation (6) to be described later; $G_P$, $G_{RP}$, $G_{YD}$, $G_{ST}$ and $G_{SL}$ are control gains for proportional control operations; LPF is a low-pass filter; and s is a differentiating element. Also $f_2$ is link angular velocity predicted value represented by Equation (10) to be described later, $f_3$ is a roll rate gain, and $f_4$ is a function for eliminating influence of counter-steering operation represented by Equation (26) to be described later.

When turn travel is started, the vehicle body inclination control system starts the vehicle body inclination control processing. As a result of performance of attitude control, the vehicle 10 turns in a state in which, as shown in FIG. 3(b), the vehicle body is inclined toward the turning-locus inner side (the right side in the drawing) by the link mechanism 30. Also, at the time of turn travel, a centrifugal force toward the turning-locus outer side acts on the vehicle body, and the lateral direction component of the force of gravity is generated as a result of the vehicle body being inclined toward the turning-locus inner side. The lateral acceleration computation section 48 executes the lateral acceleration computation processing so as to calculate a combined lateral acceleration a and output it to the inclination control section 47. In response thereto, the inclination control section 47 performs feedback control and outputs the speed instruction value (control value) determined such that the value of the combined lateral acceleration a becomes zero. The link motor control section 42 outputs the torque instruction value to the link motor 25 on the basis of the speed instruction value output from the inclination control section 47.

Notably, the vehicle body inclination control processing is processing which is repeatedly executed by the vehicle body inclination control system at predetermined intervals $T_s$ (e.g., 5 ms) during a period during which the power supply of the vehicle 10 is on. The vehicle body inclination control processing is processing for improving the turning performance and making the occupant feel comfortable at the time of turning.

Also, in FIG. 6, reference numeral 44A denotes a first sensor position showing the position on the vehicle body at which the first lateral acceleration sensor 44a is disposed, and reference numeral 44B denotes a second sensor position showing the position on the vehicle body at which the second lateral acceleration sensor 44b is disposed.

The first lateral acceleration sensor 44a and the second lateral acceleration sensor 44b detect four types of accelerations and outputs the detected accelerations. The four accelerations are <1> the centrifugal force acting on the vehicle body at the time of turning, <2> the lateral direction component of the force of gravity generated as a result of the vehicle body being inclined toward the turning-locus inner side, <3> an acceleration which is produced as a result of displacement of the first lateral acceleration sensor 44a and the second lateral acceleration sensor 44b in the circumferential direction, which displacement occurs due to, for example, deformation of springs, plays, or an inclination of the vehicle body caused as a result of falling of only one of the left and right wheels 12L and 12R into a hollow of the road surface 18, and <4> an acceleration which is produced as a result of displacement of the first lateral acceleration sensor 44a and the second lateral acceleration sensor 44b in the circumferential direction, which displacement occurs due to the operation of the link motor 25 or a reaction thereof. Of these four types of accelerations, the accelerations of <1> and <2> are irrelevant to the heights of the first lateral acceleration sensor 44a and the second lateral acceleration sensor 44b; i.e., $L_1$ and $L_2$. Meanwhile, since the accelerations of <3> and <4> are accelerations produced as a result of the displacement in the circumferential direction, they are proportional to the distance from the roll center; i.e., they are approximately proportional to $L_1$ and $L_2$.

The detected values of accelerations of <3> which are detected and outputted by the first lateral acceleration sensor 44a and the second lateral acceleration sensor 44b are represented by $a_{x1}$ and $a_{x2}$; and the detected values of accelerations of <4> which are detected and outputted by the first lateral acceleration sensor 44a and the second lateral acceleration sensor 44b are represented by $a_{M1}$ and $a_{M2}$. Also, the detected value of the acceleration of <1> which is detected and outputted by the first lateral acceleration sensor 44a and the second lateral acceleration sensor 44b is represented by $a_T$; and the detected value of the acceleration of <2> which is detected and outputted by the first lateral acceleration sensor 44a and the second lateral acceleration sensor 44b is represented by $a_G$. Notably, since the accelerations of <1> and <2> are irrelevant to the heights of the first lateral acceleration sensor 44a and the second lateral acceleration sensor 44b, the accelerations detected by the first lateral acceleration sensor 44a and the second lateral acceleration sensor 44b are equal to each other.

The angular velocity of the displacement in the circumferential direction which occurs due to, for example, deformation of springs, plays, or an inclination of the vehicle body caused as a result of falling of only one of the left and right wheels 12L and 12R into a hollow of the road surface 18 is represented by $\omega_R$, and its angular acceleration is represented by $\omega_R'$. Also, the angular velocity of the displacement in the circumferential direction which occurs due to the operation of the link motor 25 or its reaction is represented by $\omega_M$, and its angular acceleration is represented by $\omega_M'$. Notably, the angular velocity $\omega_M$ or the angular acceleration $\omega_M'$ can be obtained from the angle detected by the link angle sensor 25a.

The relations $a_{x1}=L_1\omega_R'$, $a_{x2}=L_2\omega_R'$, $a_{M1}=L_1\omega_M'$, and $a_{M2}=L_2\omega_M'$ are satisfied.

Also, the detected values of the accelerations detected by the first lateral acceleration sensor 44a and the second lateral acceleration sensor 44b are represented by $a_1$ and $a_2$. Since the detected accelerations $a_1$ and $a_2$ are the sum of the four types of accelerations of <1> to <4>, the accelerations $a_1$ and $a_2$ are represented by the following Equations (1) and (2).

$$a_1 = a_T + a_G + L_1\omega_R' + L_1\omega_M' \quad \text{Equation (1)}$$

$$a_2 = a_T + a_G + L_2\omega_R' + L_2\omega_M' \quad \text{Equation (2)}$$

The following Equation (3) can be obtained by subtracting Equation (2) from Equation (1).

$$a_1 - a_2 = (L_1 - L_2)\omega_R' + (L_1 - L_2)\omega_M' \quad \text{Equation (3)}$$

Since the values of $L_1$ and $L_2$ are the heights of the first lateral acceleration sensor 44a and the second lateral acceleration sensor 44b, they are known. Also, since the value of $\omega_M'$ is the derivative value of the angular velocity $\omega_M$ of the link motor 25, it is known. Therefore, only the value of the first term $\omega_R'$ of the right side of Equation (3) is unknown, and all the values of the remaining terms are known. Accordingly, the value of $\omega_R'$ can be obtained from the accelerations $a_1$ and $a_2$ detected by the first lateral acceleration sensor 44a and the second lateral acceleration sensor 44b. Namely, unnecessary acceleration components can be removed on the basis of the acceleration $a_1$ and $a_2$ detected by the first lateral acceleration sensor 44a and the second lateral acceleration sensor 44b.

When the vehicle body inclination control system starts the vehicle body inclination control processing, the lateral acceleration computation section 48 starts the lateral acceleration computation processing, and first obtains the first lateral acceleration sensor value $a_1$ (step S1) and the second lateral acceleration sensor value $a_2$ (step S2). Subsequently, the lateral acceleration computation section 48 calculates an acceleration difference $\Delta a$ (step S3). The acceleration difference $\Delta a$ is represented by the following Equation (4).

$$\Delta a = a_1 - a_2 \quad \text{Equation (4)}$$

Subsequently, the lateral acceleration computation section 48 retrieves $\Delta L$ (step S4), and retrieves $L_2$ (step S5). $\Delta L$ is represented by the following Equation (5).

$$\Delta L = L_1 - L_2 \quad \text{Equation (5)}$$

Subsequently, the lateral acceleration computation section 48 calculates the combined lateral acceleration a (step S6). Notably, the combined lateral acceleration a is a value corresponding to the lateral acceleration sensor value a detected by a lateral acceleration sensor section 44 composed of a single sensor, and is a value obtained by combining the first lateral acceleration sensor value $a_1$ and the second lateral acceleration sensor value $a_2$ in accordance with the following Equations (6) and (7).

$$a = a_2 - (L_2/\Delta L)\Delta a \quad \text{Equation (6)}$$

$$a = a_1 - (L_1/\Delta L)\Delta a \quad \text{Equation (7)}$$

Theoretically, the value obtained by Equation (6) is the same as that obtained by Equation (7). However, since the acceleration produced as a result of the displacement in the circumferential direction is proportional to the distance from the roll center, in actuality, it is desired that the acceleration detected by the sensor of the lateral acceleration sensor section 44 which is closer to the roll center; i.e., the acceleration $a_2$ detected by the second lateral acceleration sensor 44b be used as a reference. Therefore, in the present embodiment, the combined lateral acceleration a is calculated by Equation (6).

Finally, the lateral acceleration computation section 48 outputs the combined lateral acceleration a to the inclination control section 47 (step S7), and ends the lateral acceleration computation processing.

As described above, in the present embodiment, the first lateral acceleration sensor 44a and the second lateral acceleration sensor 44b are disposed at vertical positions which differ from each other; the combined lateral acceleration a is calculated by combining the first lateral acceleration sensor value $a_1$ and the second lateral acceleration sensor value $a_2$; and feedback control is performed so as to control the inclination angle of the vehicle body such that the value of the combined lateral acceleration a becomes zero.

Since unnecessary acceleration components can be removed by the above-described processing, the vehicle body inclination control system is not affected by the road surface condition and can prevent generation of vibration, divergence, etc. of the control system. Therefore, control responsiveness can be improved by increasing the control gain of the vehicle body inclination control system.

In the present embodiment, the lateral acceleration sensor section 44 includes two sensors. However, the number of the sensors of the lateral acceleration sensor section 44 may be three or more, so long as the lateral acceleration sensor section 44 includes a plurality of sensors disposed at different heights.

Next, there will be described then operation of link angular velocity estimation processing for estimating link angular velocity at the time of turn travel.

Figure 8:
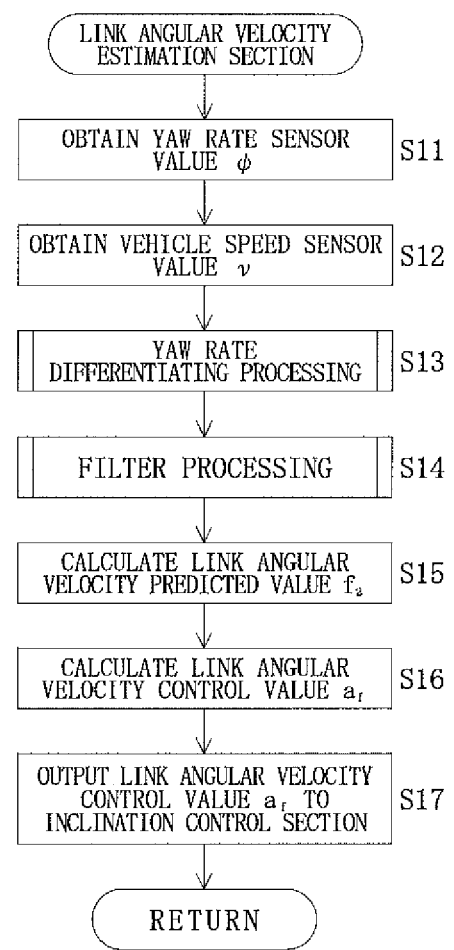
[FIG. 8] Flowchart showing the operation of link angular velocity estimation processing according to the first embodiment of the present invention.
Figure 9:
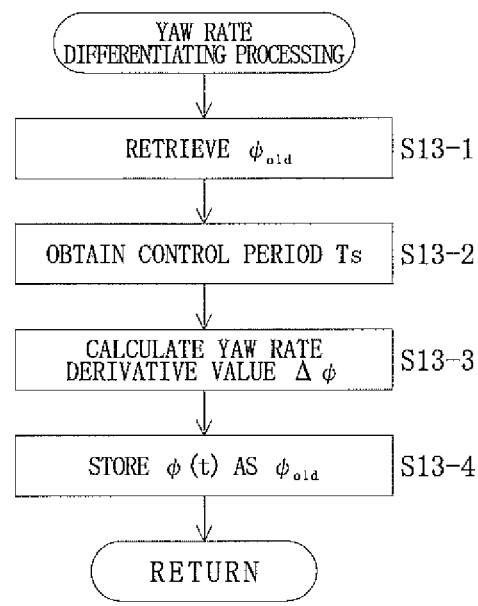
[FIG. 9] Flowchart showing a yaw rate differentiating processing subroutine according to the first embodiment of the present invention.
Figure 10:
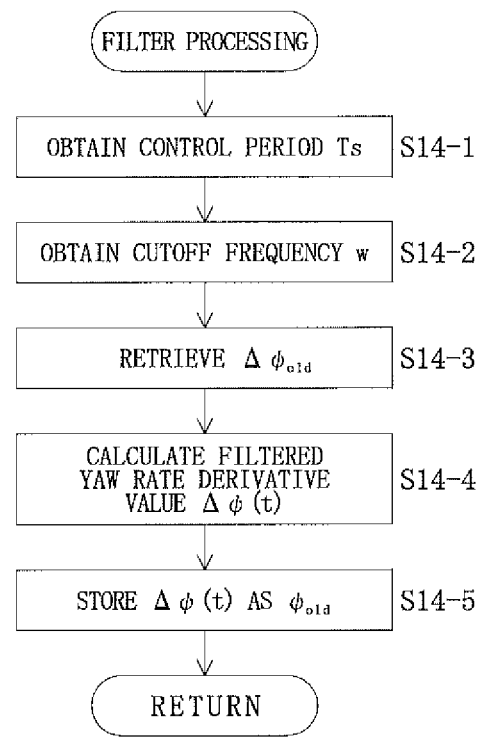
[FIG. 10] Flowchart showing a filtering processing subroutine according to the first embodiment of the present invention.

FIG. 8 is a flowchart showing the operation of link angular velocity estimation processing according to the first embodiment of the present invention. FIG. 9 is a flowchart showing a yaw rate differentiating processing subroutine according to the first embodiment of the present invention. FIG. 10 is a flowchart showing a filtering processing subroutine according to the first embodiment of the present invention.

When the link angular velocity estimation section 50 starts the link angular velocity estimation processing, it first obtains a yaw rate sensor value $\psi$, which is the value of the yaw rate detected by the yaw rate sensor 44d (step S11), and obtains a vehicle speed sensor value v, which is the value of the vehicle speed detected by the vehicle speed sensor 54 (step S12).

Subsequently, the link angular velocity estimation section 50 executes yaw rate differentiating processing (step S13) so as to obtain $\Delta\psi$. $\Delta\psi$ is the value obtained by differentiating the yaw rate with respect to time, and corresponds to the yaw angular acceleration.

In the yaw rate differentiating processing, the link angular velocity estimation section 50 first retrieves $\psi_{old}$ (step S13-1). Notably, $\psi_{old}$ is the value of $\psi(t)$ stored at the time of previous execution of the vehicle body inclination control processing. Notably, $\psi_{old}$ is set to zero by initial setting.

Subsequently, the link angular velocity estimation section 50 obtains the control period (interval) $T_S$ (step S13-2).

Subsequently, the link angular velocity estimation section 50 calculates a yaw rate derivative value $\Delta\dot\psi$ (step S13-3). $\Delta\dot\psi$ is calculated by the following Equation (8).

$$\Delta\dot\psi=(\psi(t)-\psi_{old})/T_S \qquad \text{Equation (8)}$$

The link angular velocity estimation section 50 then stores $\psi(t)$ as $\psi_{old}$ (step S13-4), and ends the yaw rate differentiating processing.

Subsequently, the link angular velocity estimation section 50 performs filter processing for the yaw rate derivative value $\Delta\dot\psi$ (step S14).

In the filter processing, the link angular velocity estimation section 50 first obtains the control period $T_S$ (step S14-1).

Subsequently, the link angular velocity estimation section 50 obtains a cutoff frequency w (step S14-2).

Subsequently, the link angular velocity estimation section 50 retrieves $\Delta\dot\psi_{old}$ (step S14-3). Notably, $\Delta\dot\psi_{old}$ is the value of $\Delta\dot\psi(t)$ stored at the time of previous execution of the vehicle body inclination control processing.

Subsequently, the link angular velocity estimation section 50 calculates a filtered yaw rate derivative value $\Delta\dot\psi(t)$ (step S14-4). $\Delta\dot\psi(t)$ is calculated by the following Equation (9).

$$\Delta\dot\psi(t)=\Delta\dot\psi\mathrm{old}/(1+Tsw)+Tsw\dot\psi/(1+Tsw) \qquad \text{Equation (9)}$$

Equation (9) is an equation of the IIR (Infinite Impulse Response) filter which is commonly used as a band-pass filter and can be just replaced by a low-pass filter of a first-order lag type. As the IIR filter, the Chebyshev type II filter or others may be used, for example. Also, the FIR (Finite Impulse Response) filter which is commonly used as a band-pass filter may be used. The cut-off frequency (−3 [dB] frequency) of the band pass filter is preferably 10 [Hz] or less, and, more preferably, is a few [Hz].

The link angular velocity estimation section 50 then stores $\Delta\dot\psi(t)$ as $\Delta\dot\psi_{old}$ (step S14-5), and ends the filter processing. Namely, the value of $\Delta\dot\psi(t)$ calculated at the time of present execution of the vehicle body inclination control processing is stored in the storage means as $\Delta\dot\psi_{old}$.

Subsequently, the link angular velocity estimation section 50 calculates the link angular velocity predicted value $f_2$ (step S15). When the force of gravity is represented by g, the link angular velocity predicted value $f_2$ is calculated by the following Equation (10).

$$f_2'=d\eta/dt=(v/g)(d\dot\psi/dt) \qquad \text{Equation (10)}$$

As described above, the link angle sensor 25a detects a change in the angle of the upper lateral link unit 31U relative to the central vertical member 21; namely, a change in the link angle. Here, the link angle is represented by $\eta$, and the inclination angle of the vehicle body at the time of turning is assumed to be controlled such that a balance is achieved between the centrifugal force $a_0$, which a lateral acceleration, and the force of gravity g. If the road surface is horizontal, the centrifugal force $a_0$ and the force of gravity g satisfy the relation represented by the following Equation (11).

$$a_0\cdot\cos\eta=g\cdot\sin\eta \qquad \text{Equation (11)}$$

The following Equation (12) is derived from Equation (11).

$$a_0/g=\sin\eta/\cos\eta=\tan\eta \qquad \text{Equation (12)}$$

Further, the following Equation (13) is derived from Equation (12).

$$a_0=g\cdot\tan\eta \qquad \text{Equation (13)}$$

Meanwhile, when the yaw rate is represented by $\dot\psi$ and the turning radius is represented by r, the vehicle speed v and the centrifugal force (lateral acceleration) $a_0$ which acts on the vehicle body at the time of turning are represented by the following Equations (14) and (15).

$$v=r\dot\psi \qquad \text{Equation (14)}$$

$$a_0=r\dot\psi^2=v\dot\psi \qquad \text{Equation (15)}$$

The following Equation (16) is derived from Equations (15) and (13).

$$\tan\eta=v\dot\psi/g \qquad \text{Equation (16)}$$

Further, the approximation of $\tan\eta\approx\eta$ is possible, and a change in the vehicle speed v is sufficiently slow as compared with a change in the link angle $\eta$. Therefore, the vehicle speed v can be considered as a constant, and Equation (10) can be obtained from Equation (16).

Subsequently, the link angular velocity estimation section 50 calculates a link angular velocity control value $a_f$ (step S16). The link angular velocity control value $a_f$ is calculated by the following Equation (17).

$$a_f=Ad\eta/dt \qquad \text{Equation (17)}$$

A is an arbitrary value between 0 to 1 and is a tuning constant determined in accordance with the structure of the vehicle 10.

Finally, the link angular velocity estimation section 50 outputs the link angular velocity control value $a_f$ to the inclination control section 47 (step S17), and ends the link angular velocity estimation processing.

Next, there will be described the operation of inclination control processing for outputting the speed instruction value to the link motor control section 42.

Figure 11:
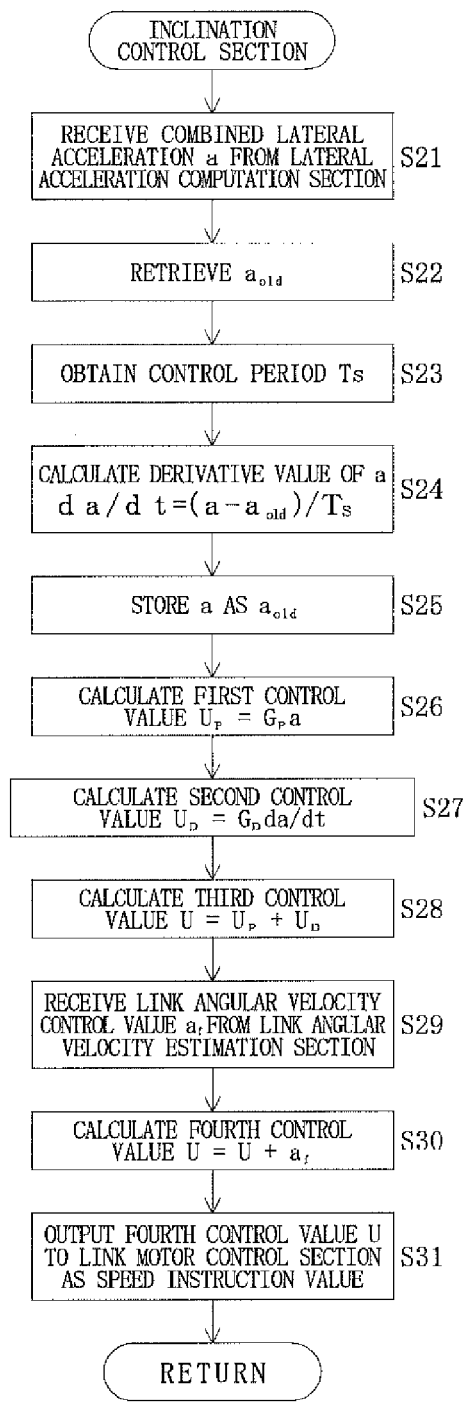
[FIG. 11] Flowchart showing the operation of inclination control processing according to the first embodiment of the present invention.

FIG. 11 is a flowchart showing the operation of the inclination control processing according to the first embodiment of the present invention.

In the inclination control processing, the inclination control section 47 first receives the combined lateral acceleration a from the lateral acceleration computation section 48 (step S21).

Subsequently, the inclination control section 47 retrieves $a_{old}$ (step S22). $a_{old}$ is the combined lateral acceleration a stored at the time of previous execution of the vehicle body inclination control processing. Notably, $a_{old}$ is set to zero by initial setting.

Subsequently, the inclination control section 47 obtains the control period $T_S$ (step S23), and calculates the derivative value of a (step S24). When the derivative value of a is represented by da/dt, da/dt is calculated by the following Equation (18)

$$da/dt=(a-a_{old})/T_s \qquad \text{Equation (18)}$$

The inclination control section 47 then stores a as $a_{old}$ (step S25). Namely, the lateral acceleration sensor value a obtained at the time of present execution of the vehicle body inclination control processing is stored in the storage means as $a_{old}$.

Subsequently, the inclination control section 47 calculates a first control value $U_P$ (step S26). When a control gain used for proportional control operation; i.e., a proportional gain, is represented by $G_P$, the first control value $U_P$ is calculated by the following Equation (19).

$$U_P=G_P a \qquad \text{Equation (19)}$$

Subsequently, the inclination control section 47 calculates a second control value $U_D$ (step S27). When a control gain used for derivative control operation; i.e., a derivative time, is represented by $G_D$, the second control value $U_D$ is calculated by the following Equation (20).

$$U_D = G_D da/dt \qquad \text{Equation (20)}$$

Subsequently, the inclination control section 47 calculates a third control value U (step S28). The third control value U is the sum of the first control value $U_P$ and the second control value $U_D$, and is calculated by the following Equation (21).

$$U = U_P + U_D \qquad \text{Equation (21)}$$

Upon completion of the calculation of the third control value U, the inclination control section 47 receives the link angular velocity control value $a_f$ from the link angular velocity estimation section 50 (step S29).

Subsequently, the inclination control section 47 calculates a fourth control value U (step S30). The fourth control value U is the sum of the third control value U and the link angular velocity control value $a_f$, and is calculated by the following Equation (22).

$$U = U + a_f \qquad \text{Equation (22)}$$

Finally, the inclination control section 47 outputs the fourth control value U to the link motor control section 42 as a speed instruction value (step S31), and ends the processing.

Next, there will be described the operation of steering control processing, which is a portion of the operation of vehicle body control processing performed during turn travel.

Figure 12:
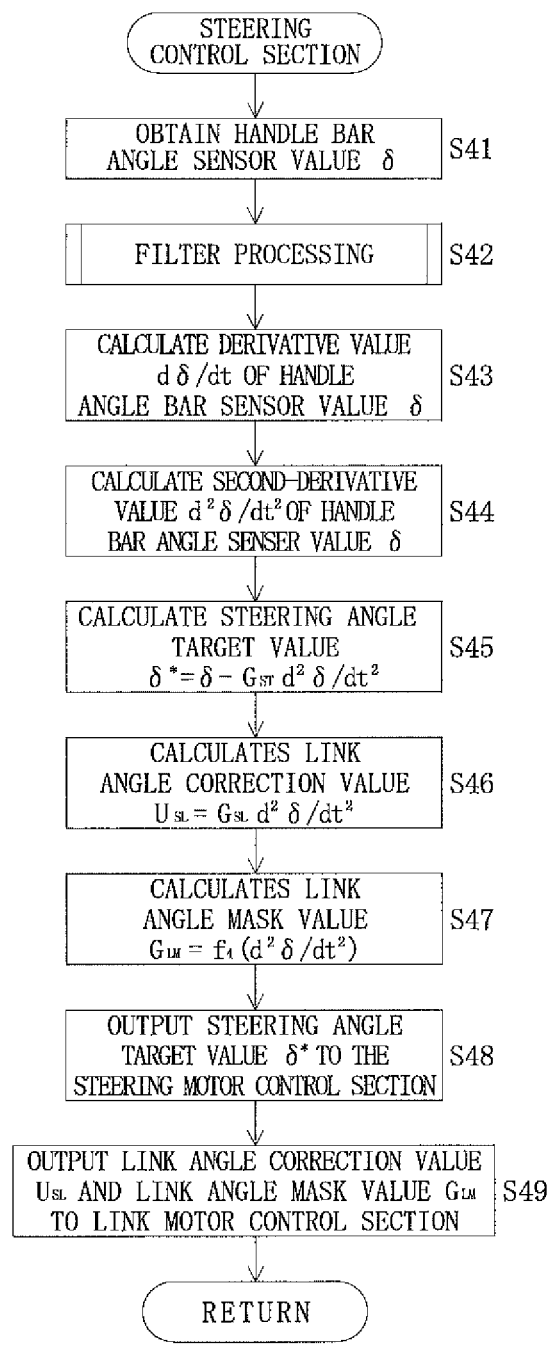
[FIG. 12] Flowchart showing the operation of steering control processing according to the first embodiment of the present invention.

FIG. 12 is a flowchart showing the operation of steering control processing according to the first embodiment of the present invention.

In the steering control processing, a function may act according to the vehicle speed v after a handle bar angle sensor value δ is obtained. For example, when the vehicle speed is high, in general, the steering angle does not need to be enlarged even though the handle bar is steered large. Therefore, the handle bar angle sensor value δ, which is used for calculations in the steering control processing, may be determined through multiplying the value obtained from the handle bar angle sensor 62 by a function in inverse to the vehicle speed v.

The yaw rate of the vehicle body may be determined by the handle angle sensor value δ. This would be achieved by constituting such a feedback control system that a value of yaw rate is determined according to a value of the handle angle sensor value δ, irrelevant to the vehicle speed v.

All of these are techniques adoptable for the Steer-by-wire system.

When the steering control section 66 in the present embodiment starts the steering control processing, it first obtains a handle bar angle sensor value δ, which is the value of the handle bar angle detected by the handle bar angle sensor 62 (Step S41). The handle bar angle is the steering angle command value inputted by the occupant operating the handle bar 41a.

Subsequently, the steering control section 66 executes filter processing for the handle bar angle sensor value δ (Step S42). This filter processing is a processing by a low-pass filter, similarly to the filter processing in the link angular velocity estimation processing, and may be executed with using an IIR filter or a FIR filter as a band-pass filter, or with using a simple low-pass filter of a first-order lag type.

Subsequently, the steering control section 66 calculates a yaw rate derivative value dδ/dt of the handle bar angle sensor value δ (step S43). The yaw rate derivative value dδ/dt of the handle bar angle sensor value δ represents an angular velocity of the handle bar angle.

Subsequently, the steering control section 66 calculates a yaw rate second derivative value $d^2δ/dt^2$ of the handle bar angle sensor value δ (step S44). The yaw rate second derivative value $d^2δ/dt^2$ of the handle bar angle sensor value δ represents an angular acceleration of the handle bar angle.

Subsequently, the steering control section 66 calculates a steering angle target value δ* (step S45). When a control gain corresponding to the counter-steering operation is represented by $G_{ST}$, the steering angle target value δ* is calculated by the following Equation (23).

$$δ^* = δ - G_{ST} d^2 δ/dt^2 \qquad \text{Equation (23)}$$

Subsequently, the steering control section 66 calculates a link angle correction value $U_{SL}$ (step S46). When, a control gain for controlling the link angle corresponding to the handle bar angle, or a control gain for controlling the link angle to incline the vehicle body toward turning-locus inner side corresponding to the steering direction is represented by $G_{SL}$, the link angle correction value $U_{SL}$ is calculated by the following Equation (24).

$$U_{SL} = G_{SL} d^2 δ/dt^2 \qquad \text{Equation (24)}$$

Subsequently, the steering control section 66 calculates a link angle mask value $G_{LM}$ (Step S47). When a function for eliminating influence of counter-steering operation represented by $f_4$, the link angle mask value $G_{LM}$ is calculated by the following Equation (25).

$$G_{LM} = f_4(d^2 δ/dt^2) \qquad \text{Equation (25)}$$

Notably, $f_4$ is a function for eliminating the influence of the inclination control processing based on a lateral acceleration at the time of counter-steering operation. Since the counter-steering operation introduces a turn in a direction opposite to the occupant intention, a centrifugal force generated by the turn is detected as a lateral acceleration to incline the vehicle body toward turning-locus inner side as the occupant intended. Accordingly, if the inclination control processing based on this lateral acceleration is executed, the vehicle body would incline toward turning-locus outer side against the occupant intended. Therefore, it is necessary to eliminate the influence of the inclination control processing based on the lateral acceleration at the time of counter-steering operation.

Thereby, $f_4$ is constituted as a function which outputs 0 when an input is at the highest possible value. Notably, the value of output is in a range of 0-1. For example, when the input is represented by x and the highest possible value of x is represented by $X_{MAX}$, the output y is obtained by the following Equation (26).

$$y = -1/X_{MAX}|x| + 1 \qquad \text{Equation (26)}$$

Subsequently, the steering control section 66 outputs the calculated steering angle target value δ* to the steering motor control section 67 (Step S48).

Finally, the steering control section 66 outputs the link angle correction value $U_{SL}$ and the link angle mask value $G_{LM}$, which were calculated, to the link motor control section 42 (Step S49), and ends steering control processing.

Next, there will be described the operation of link motor control processing for outputting the torque instruction value to the link motor 25.

Figure 13:
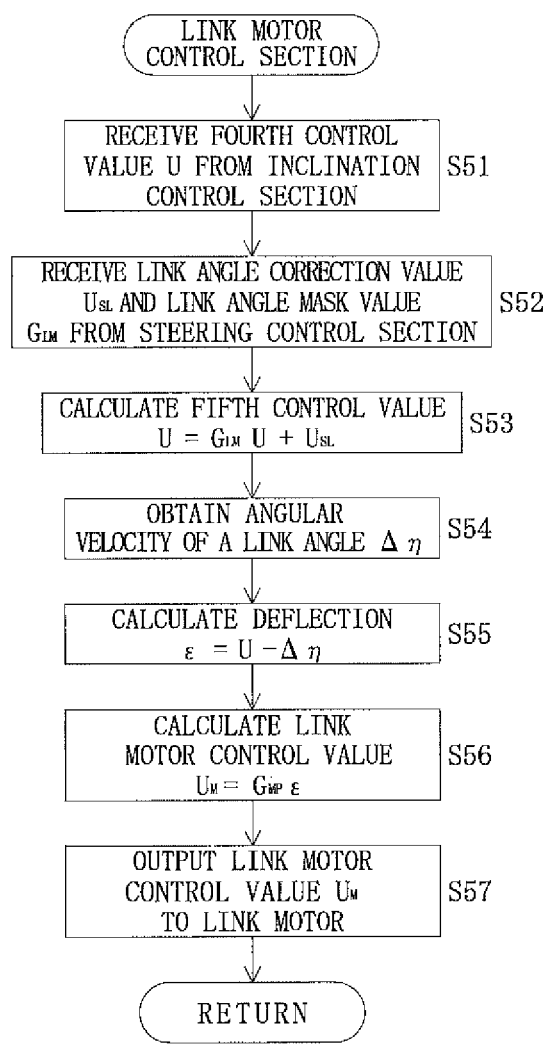
[FIG. 13] Flowchart showing the operation of link motor control processing according to the first embodiment of the present invention.

FIG. 13 is a flowchart showing the operation of the link motor control processing according to the first embodiment of the present invention.

In the link motor control processing, the link motor control section 42 first receives the fourth control value U from the inclination control section 47 (step S51).

Subsequently, the link motor control section 42 receives the link angle correction value $U_{SL}$ and the link angle mask value $G_{LM}$ from the steering control section 66 (Step S52).

Subsequently, Then, the link motor control section 42 calculates the fifth control value U (Step S53). The fifth control value U is calculated by the following Equation (27), based on the fourth control value U, the link angle correction value $U_{SL}$, and the link angle mask value $G_{LM}$.

$$U=G_{LM}U+U_{SL} \quad \text{Equation (27)}$$

Subsequently, the link motor control section 42 obtains the angular velocity of a link angle or a link angular velocity $\Delta\eta$ (Step S54). The link motor control section 42 obtains a link angle sensor value $\eta$ detected by the link angle sensor 25a, and calculates the link angular velocity $\Delta\eta$ by differentiating the link angle sensor value $\eta$ with respect to time. The link motor control section 42 can also obtain the value of link angular velocity $\Delta\eta$ from the disturbance computation section 43.

Subsequently, the link motor control section 42 calculates a deflection as a control error (Step S55). When the deflection is represented by $\epsilon$, the deflection $\epsilon$ is calculated by the following Equation (28).

$$\epsilon=U-\Delta\eta \quad \text{Equation (28)}$$

Notably, U is the fifth control value U.

Subsequently, the link motor control section 42 calculates a link motor control value as a torque instruction value for operating the link motor 25 (Step S56). When the link motor control value is represented by $U_M$, the $U_M$ is calculated by the following Equation (29).

$$U_M=G_{MP}\epsilon \quad \text{Equation (29)}$$

Notably, $G_{MP}$ is a motor control proportional gain, and the value of $G_{MP}$ is set by an experiment or the like, and is stored in the memory means in advance.

Finally, the link motor control section 42 outputs the link motor control value $U_M$ to the link motor 25 (Step S57), and ends link motor control processing.

In the present embodiment, the link motor control processing is a proportional control or a P control. However, the link motor control processing may be a PID control.

As described above, in the present embodiment, the center of gravity of vehicle is controlled to move in the steering direction included in the steering instruction information at the initial steering stage so that the acceleration toward turning-locus inner side is generated. That is, at a stage just after the occupant started to operate the handle bar 41a, the center of gravity of vehicle is moved in the steering direction, thereby the acceleration toward turning-locus inner side is generated. The steering control section 66 varies the steering angle of the wheel 12F as a steerable wheel in the direction opposite to the steering direction inputted by the operation of the handle bar 41a, at a stage just after the occupant started to operate the handle bar 41a. In another word, the steering control section 66 executes a counter-steering operation to move the center of gravity of vehicle toward the steering direction.

Thereby, the center of gravity of vehicle can be moved toward turning-locus inner side at the initial steering stage, and the vehicle body can incline smoothly toward turning-locus inner side, so that the stability of the vehicle body can be maintained without sacrificing drivability or risk aversion ability.

Next, a second embodiment of the present invention will now be described. Structural features similar to the first embodiment are denoted by common reference materials, and repeated description of operation and effects similar to those of the first embodiment is omitted.

Figure 14:
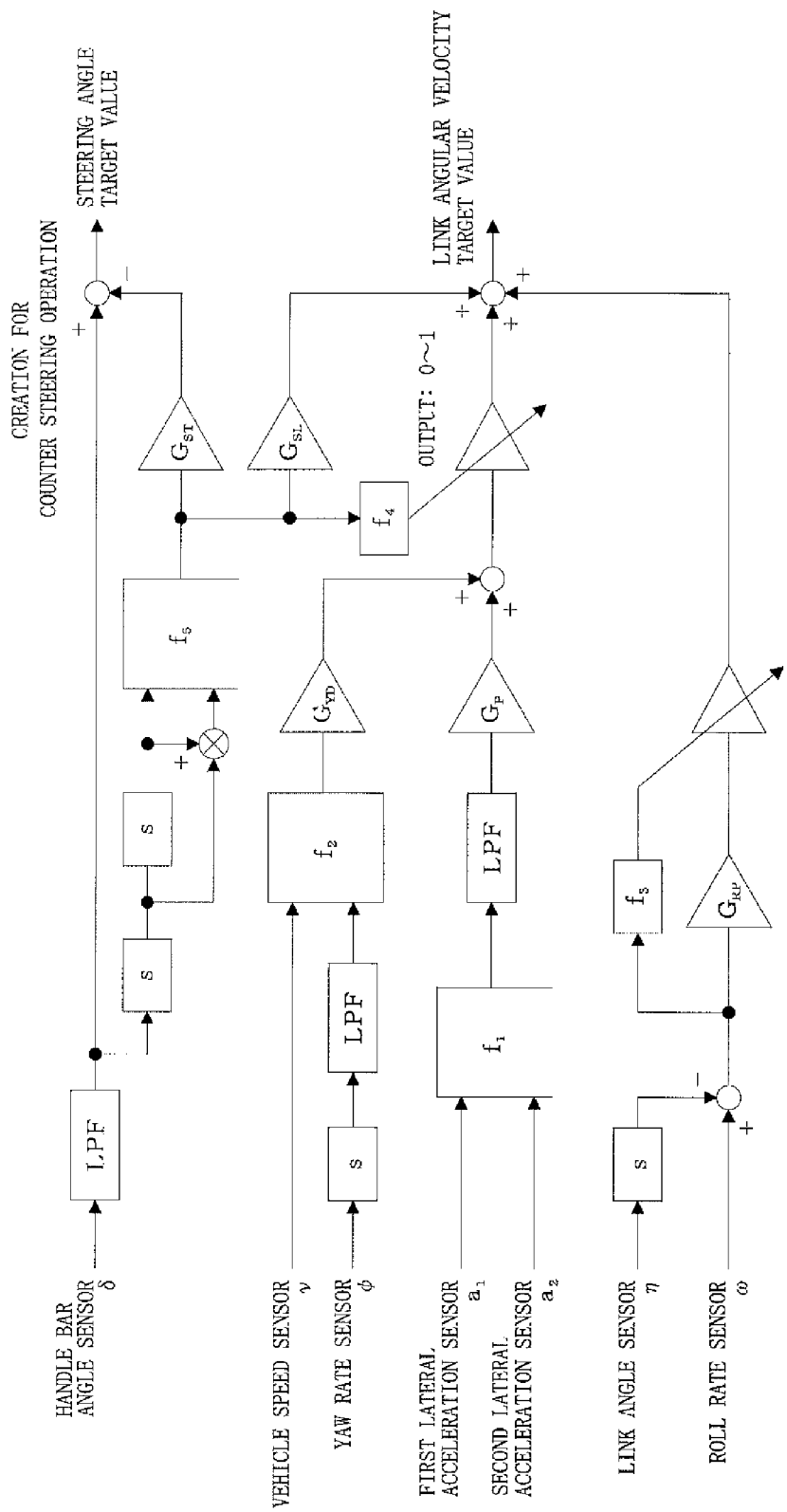
[FIG. 14] Block diagram of a control system according to a second embodiment of the present invention.
Figure 15:
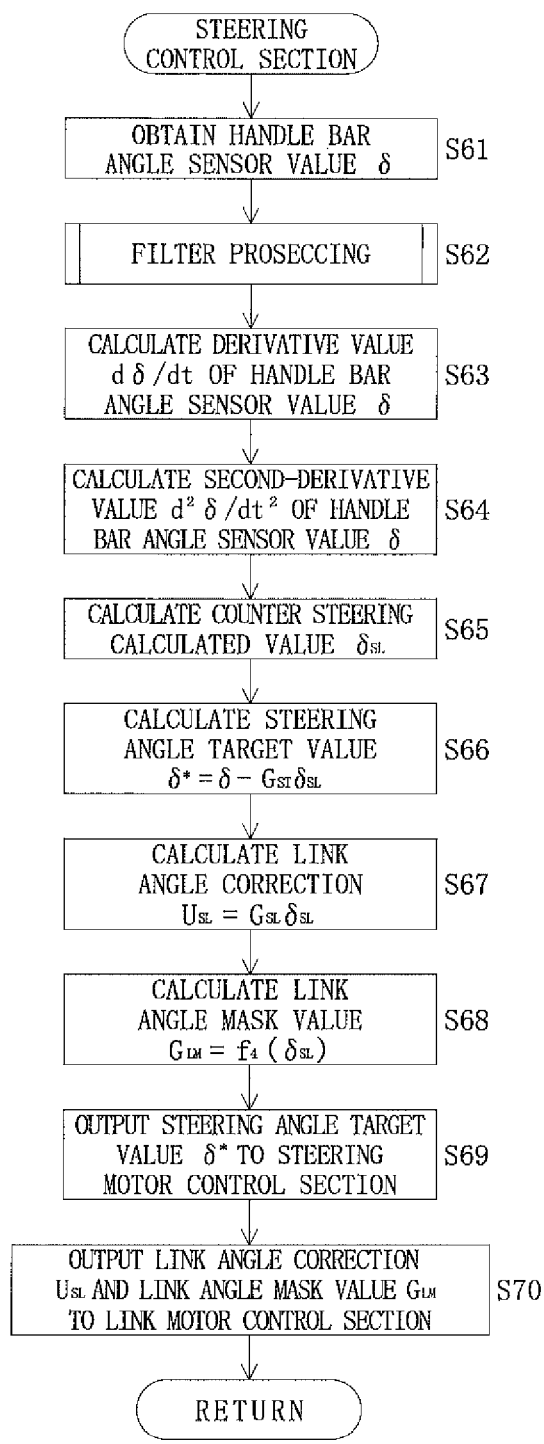
[FIG. 15] Flowchart showing the operation of steering control processing according to the second embodiment of the present invention.

FIG. 14 is a block diagram of a control system according to a second embodiment of the present invention. FIG. 15 is a flowchart showing the operation of steering control processing according to the second embodiment of the present invention.

In the vehicle body inclination control processing according to the present embodiment, a control which is realized by combining the inclination control by the inclination control ECU 46 as shown in FIG. 14 and the steering control by the steering control ECU 61 is performed. In FIG. 14, $f_5$ is a function for calculating a calculated value of steering angle in counter-steering-operation or counter-steering calculated value and is represented by Equation (30) to be described later. Other points are similar to those in FIG. 5 explained in the first embodiment, therefore description about them is omitted.

Also, description of operations of lateral acceleration computation processing, link angular velocity estimation processing, inclination control processing, and link motor control processing is omitted, since they are similar to those in the first embodiment. Only steering control processing in the present embodiment will be described.

When the steering control section 66 starts the steering control processing, it obtains a handle bar angle sensor value $\delta$, which is the value of the handle bar angle detected by the handle bar angle sensor 62 (Step S61), executes filter processing for the handle bar angle sensor value $\delta$ (Step S62), calculates a yaw rate derivative value $d\delta/dt$ of the handle bar angle sensor value $\delta$ (step S63), and calculates a yaw rate second derivative value $d^2\delta/dt^2$ of the handle bar angle sensor value $\delta$ (step S64). The operations up to this point are similar to those of Steps S41-S44 in steering control processing in the first embodiment.

Subsequently, the steering control section 66 calculates a counter-steering calculated value $\delta_{SL}$ (Step S65). The counter-steering calculated value $\delta_{SL}$ is calculated according to a function $f_5$, and, specifically, is obtained by the following Equation (30).

$$\delta_{SL}=d^2\delta/dt^2: \text{in case where } (d^2\delta/dt^2)\cdot(d\delta/dt)>=0$$

$$\delta_{SL}=0: \text{in case where } (d^2\delta/dt^2)\cdot(d\delta/dt)<0 \quad \text{Equation (30)}$$

As a result, the counter-steering operation is generated only at the initial steering stage or at a stage just after the occupant started to operate the handle bar 41a, and the counter-steering operation is not generated at the final steering stage.

Subsequently, the steering control section 66 calculates a steering angle target value $\delta^*$ (step S66). The steering angle target value $\delta^*$ is calculated by the following Equation (31).

$$\delta^*=\delta-G_{SL}\delta_{SL} \quad \text{Equation (31)}$$

Subsequently, the steering control section 66 calculates a link angle correction value $U_{SL}$ (step S67). The link angle correction value $U_{SL}$ is calculated by the following Equation (32).

$$U_{SL}=G_{SL}\delta_{SL} \quad \text{Equation (32)}$$

Subsequently, the steering control section 66 calculates a link angle mask value $G_{LM}$ (Step S68). The link angle mask value $G_{LM}$ is calculated by the following Equation (33).

$$G_{LM}=f_4(\delta_{SL}) \quad \text{Equation (33)}$$

Subsequently, the steering control section 66 outputs the calculated steering angle target value $\delta^*$ to the steering motor control section 67 (Step S69).

Finally, the steering control section 66 outputs the link angle correction value $U_{SL}$ and the link angle mask value $G_{LM}$, which were calculated, to the link motor control section 42 (Step S70), and ends steering control processing.

As described above, in the present embodiment, the derivative value of the steering direction included in the steering instruction information is employed. Specifically, the counter-steering calculated value $\delta_{SL}$, which is calculated according to the function $f_5$, is employed.

Thereby, the counter-steering operation is generated only at the initial steering stage or at a stage just after the occupant started to operate the handle bar 41$a$, and the counter-steering operation is not generated at the final steering stage.

Next, a third embodiment of the present invention will now be described. Structural features similar to the first and second embodiments are denoted by common reference materials, and repeated description of operation and effects similar to those of the first and second embodiments is omitted.

Figure 16:
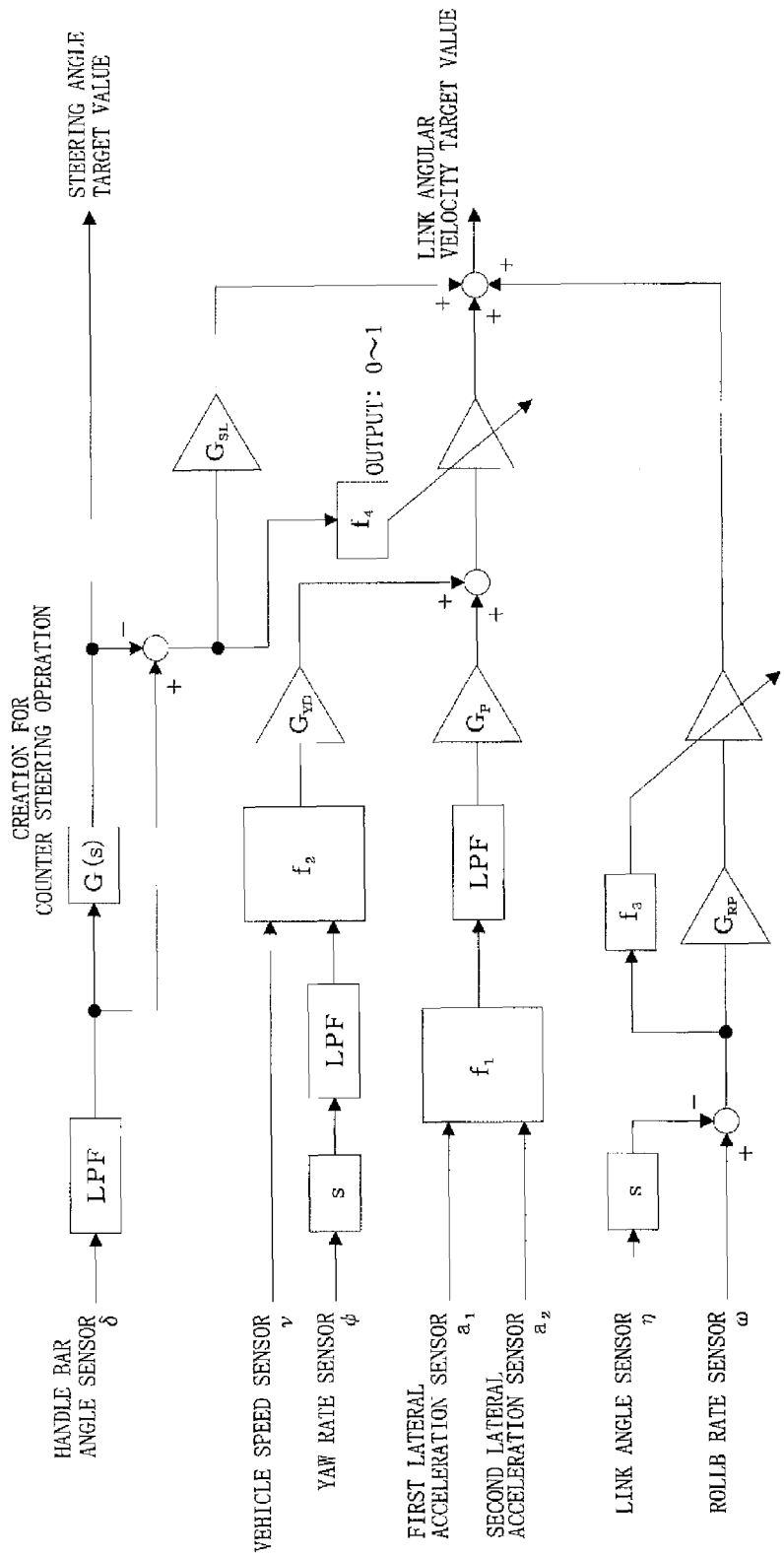
[FIG. 16] Block diagram of a control system according to a third embodiment of the present invention.
Figure 17:
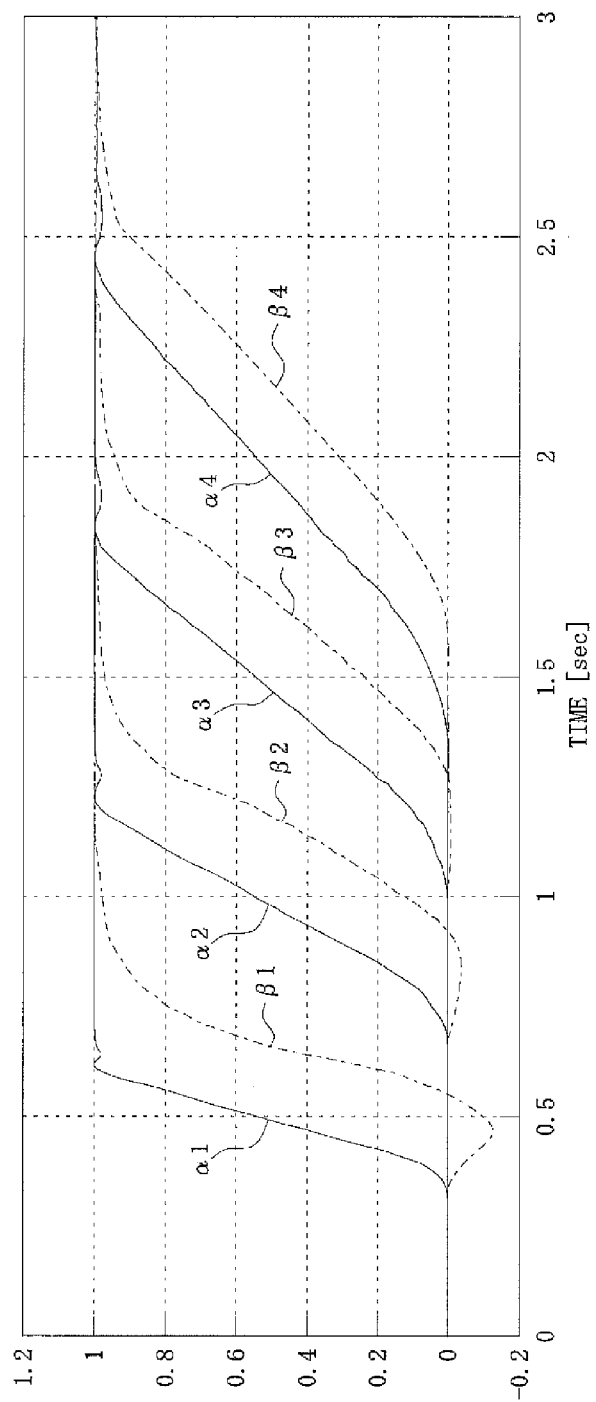
[FIG. 17] Illustration of a relation between an input and an output of a transfer function according to the third embodiment of the present invention.
Figure 18:
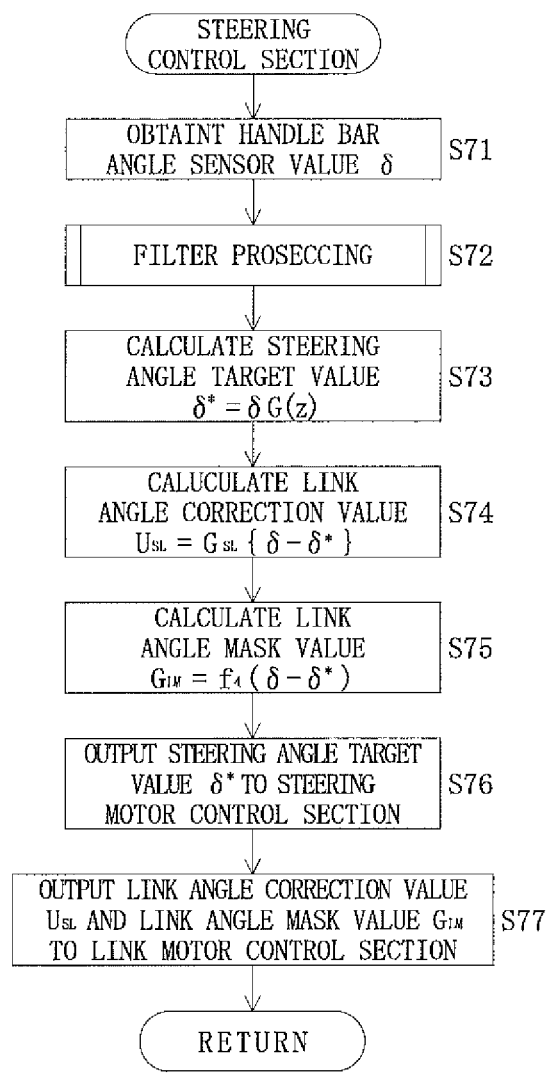
[FIG. 18] Flowchart showing the operation of steering control processing according to the third embodiment of the present invention.

FIG. 16 is a block diagram of a control system according to a third embodiment of the present invention. FIG. 17 is an illustration of a relation between an input and an output of a transfer function according to the third embodiment of the present invention. FIG. 18 is a flowchart showing the operation of steering control processing according to the third embodiment of the present invention.

In the vehicle body inclination control processing according to the present embodiment, a control which is realized by combining the inclination control by the inclination control ECU 46 as shown in FIG. 16 and the steering control by the steering control ECU 61 is performed. In FIG. 16, G (s) is a transfer function for calculating a gain of steering operation including counter-steering operation, and is represented by the following Equation (34), for example, using Laplace variable s.

$$\{1-0.1s\}/\{1+0.11s+0.001s^2\} \quad \text{Equation (34)}$$

Notably, the Equation (34) is obtained through multiplying the following Equation (35) by the following Equation (36).

$$\{1-0.1s\}/\{1+0.01s\} \quad \text{Equation (35)}$$

$$1/\{1+0.1s\} \quad \text{Equation (36)}$$

The Equation (35) corresponds to such a transfer function that includes a zero-point in expression of Laplace variable, and the Equation (36) corresponds to a first-order lag element and is used to compensate stability.

When the transfer function G (s) is represented by the Equation (34), a relation between its input and output is illustrated as FIG. 17. In FIG. 17, a horizontal axis indicates time (second) and a vertical axis indicates gain (non-dimension). Lines $\alpha 1$-$\alpha 4$ indicate inputs, and each of lines $\beta 1$-$\beta 4$ indicates output corresponding to the lines $\alpha 1$-$\alpha 4$, respectively.

Since it is obtained through processing the value $\delta$ of handle bar angle sensor with a low pass filter, the input of transfer function G (s) corresponds to the variation of handle bar angle resulted from the operation of the handle bar 41$a$ by the occupant. The output of transfer function G (s) corresponds to the steering angle target value $\delta^*$. And the angle of lines $\alpha 1$-$\alpha 4$ represents the variation velocity of handle bar angle.

Viewed in light of the lines $\alpha 1$-$\alpha 4$ and their corresponding lines $\beta 1$-$\beta 4$, it is clear that, when the variation velocity of handle bar angle is high or when the occupant operates the handle bar 41$a$ quickly, the output of transfer function G (s) is minus or the counter-steering operation is generated at the initial steering stage. Also, it is clear that, when the variation velocity of handle bar angle is low or when the occupant operates the handle bar 41$a$ slowly, the output of transfer function G (s) is not minus or the counter-steering operation is not generated even at the initial steering stage.

Other points in the block diagram of FIG. 16 are similar to those in FIG. 5 explained in the first embodiment, therefore description about them is omitted.

Also, description of operations of lateral acceleration computation processing, link angular velocity estimation processing, inclination control processing, and link motor control processing is omitted, since they are similar to those in the first embodiment. Only steering control processing in the present embodiment will be described.

When the steering control section 66 starts the steering control processing, it obtains a handle bar angle sensor value $\delta$, which is the value of the handle bar angle detected by the handle bar angle sensor 62 (Step S71), and executes filter processing for the handle bar angle sensor value $\delta$ (Step S72). The operations up to this point are similar to those of Steps S41 and S42 in steering control processing in the first embodiment.

Subsequently, the steering control section 66 calculates a steering angle target value $\delta^*$ (step S73). The steering angle target value $\delta^*$ is calculated by the following Equation (37).

$$\delta^* = \delta G(z) \quad \text{Equation (37)}$$

Notably, the transfer function G (s) is a transfer function of a continuous system, and is incalculable, as it is, by steering control ECU 61. Therefore, the transfer function G (s) of a continuation system is transformed beforehand through bilinear transform etc. into the transfer function G (z) of a discrete system for usage.

There are the following two procedures for constituting the transfer function G (s) (or G (z)). The first procedure includes preparing a first-order lag transfer function with a zero point, and adjusting values of time constants and the zero point experimentally. The second procedure includes multiplying the transfer function prepared in the first procedure by a first-order lag transfer function, in order to satisfy conditions of Nyquist stability criterion.

Notably, the value of the zero point may be varied dynamically (in real time) according to the vehicle speed or the yaw rate. The value of the zero point experimentally determined according to the vehicle speed or the yaw rate may be kept in a form of two-dimensional map, for example, and the two-dimensional map may be used for calculation.

Subsequently, the steering control section 66 calculates a link angle correction value $U_{SL}$ (step S74). The link angle correction value $U_{SL}$ is calculated by the following Equation (38).

$$U_{SL} = G_{SL}\{\delta - \delta^*\} \quad \text{Equation (38)}$$

Subsequently, the steering control section 66 calculates a link angle mask value $G_{LM}$ (Step S75). The link angle mask value $G_{LM}$ is calculated by the following Equation (39).

$$G_{LM} = f_4\{\delta - \delta^*\} \quad \text{Equation (39)}$$

Subsequently, the steering control section 66 outputs the calculated steering angle target value $\delta^*$ to the steering motor control section 67 (Step S76).

Finally, the steering control section 66 outputs the link angle correction value $U_{SL}$ and the link angle mask value $G_{LM}$, which were calculated, to the link motor control section 42 (Step S77), and ends steering control processing.

As described above, in the present embodiment, a first-order lag transfer function with a zero point is employed.

Specifically, the transfer function G (s) (or G (z)) is employed. Thereby, the counter-steering operation is generated only at the initial steering stage.

The present invention is not limited to the above-described embodiment. Numeral modifications and variations of the present invention are possible in light of the spirit of the present invention, and they are not excluded from the scope of the present invention.

Industrial Applicability

The present invention can be applied to a vehicle which has at least one pair of left and right wheels.

DESCRIPTION OF SYMBOLS

10: vehicle
11: cabin section
12F, 12L, 12R: wheel
20: main body section
25: link motor
41a: handle bar
65: steering motor

The invention claimed is:

1. A vehicle comprising:
a vehicle body which includes a steering section and a main body section connected together;
a steerable wheel which is rotatably mounted to the steering section and which steers the vehicle body;
a non-steerable wheel which is rotatably mounted to the main body section;
a steering apparatus for inputting a steering instruction information;
an inclination actuator apparatus for inclining the steering section or the main body section in a turning direction;
a steering actuator apparatus for varying a steering angle of the steerable wheel based on the steering instruction information inputted from the steering apparatus; and
a control apparatus which controls the inclination actuator apparatus and the steering actuator apparatus,
wherein the control apparatus controls a center of gravity of the vehicle to move in a steering direction included in the steering instruction information at an initial steering stage so that an acceleration toward turning-locus inner side is generated.

2. A vehicle according to claim 1, wherein the control apparatus has the center of gravity of the vehicle moved by controlling the steering actuator apparatus to vary the steering angle of the steerable wheel in direction opposite to the steering direction included in the steering instruction information at the initial steering stage.

3. A vehicle according to claim 2, wherein the control apparatus controls the steering actuator apparatus to vary the steering angle of the steerable wheel in direction opposite to the steering direction included in the steering instruction information only at the initial steering stage, by employing a derivative value of the steering angle included in the steering instruction information.

4. A vehicle according to claim 3, wherein the initial steering stage is a stage where a product of the derivative value and a second derivative value of the steering angle included in the steering instruction information is zero or plus.

5. A vehicle according to claim 2, wherein the control apparatus controls the steering actuator apparatus to vary the steering angle of the steerable wheel in direction opposite to the steering direction included in the steering instruction information only at the initial steering stage, by employing a first-order lag transfer function with a zero point.

\* \* \* \* \*